(12) United States Patent
Pyeon et al.

(10) Patent No.: US 8,549,250 B2
(45) Date of Patent: *Oct. 1, 2013

(54) APPARATUS AND METHOD FOR PRODUCING IDS FOR INTERCONNECTED DEVICES OF MIXED TYPE

(75) Inventors: Hong Beom Pyeon, Ottawa (CA); HakJune Oh, Ottawa (CA); Jin-Ki Kim, Ottawa (CA)

(73) Assignee: MOSAID Technologies Incorporated, Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/590,795

(22) Filed: Aug. 21, 2012

(65) Prior Publication Data

US 2013/0042024 A1 Feb. 14, 2013

Related U.S. Application Data

(63) Continuation of application No. 11/622,828, filed on Jan. 12, 2007, now Pat. No. 8,271,758.

(60) Provisional application No. 60/868,773, filed on Dec. 6, 2006, provisional application No. 60/870,892, filed on Dec. 20, 2006.

(51) Int. Cl.
*G06F 12/00* (2006.01)
*G06F 3/00* (2006.01)

(52) U.S. Cl.
USPC ........... 711/170; 711/101; 711/E12.084; 710/8

(58) Field of Classification Search
USPC .................... 711/170, 101; 710/8
See application file for complete search history.

(56) References Cited

U.S. PATENT DOCUMENTS

| 4,174,536 A | 11/1979 | Misunas et al. |
| 4,360,870 A | 11/1982 | McVey |
| 4,733,376 A | 3/1988 | Ogawa |
| 4,796,231 A | 1/1989 | Pinkham |

(Continued)

FOREIGN PATENT DOCUMENTS

| EP | 1717985 A1 | 11/2006 |
| WO | 01/69411 A2 | 9/2001 |

OTHER PUBLICATIONS

Samsung Electronics Co. Ltd, "256M×8 Bit / 128 M×16 Bit / 512M×8 Bit NAND Flash Memory", K9K4G08U1M, May 6, 2005, pp. 1-41.

(Continued)

*Primary Examiner* — Reginald Bragdon
*Assistant Examiner* — Aracelis Ruiz
(74) *Attorney, Agent, or Firm* — Mukundan Chakrapani; Borden Ladner Gervais LLP

(57) ABSTRACT

A plurality of memory devices of mixed type (e.g., DRAMs, SRAMs, MRAMs and NAND-, NOR- and AND-type Flash memories) having associated device type information is serially interconnected. A serial input (SI) containing a device type (DT) and a device identifier (ID) is fed to one device of the serial interconnection. Upon a match between the fed DT matches the DT of the device, the fed ID is latched in a register of the device and an ID for another device is generated, which is then transferred to the next device in the serial interconnection. Otherwise, ID generation is skipped. These steps are performed in all devices. Thus, sequential IDs are generated for the different device types and also the total number of each device type is recognized. If the fed DT is "don't care", sequential IDs are generated for all devices and the total number of the devices is recognized.

9 Claims, 25 Drawing Sheets

(56) References Cited

U.S. PATENT DOCUMENTS

| | | |
|---|---|---|
| 5,126,808 A | 6/1992 | Montalvo et al. |
| 5,136,292 A | 8/1992 | Ishida |
| 5,175,819 A | 12/1992 | Le Ngoc et al. |
| 5,243,703 A | 9/1993 | Farmwald et al. |
| 5,249,270 A | 9/1993 | Stewart et al. |
| 5,280,539 A | 1/1994 | Yeom et al. |
| 5,319,598 A | 6/1994 | Aralis et al. |
| 5,357,621 A | 10/1994 | Cox |
| 5,365,484 A | 11/1994 | Cleveland et al. |
| 5,404,460 A | 4/1995 | Thomsen et al. |
| 5,430,859 A | 7/1995 | Norman et al. |
| 5,440,694 A | 8/1995 | Nakajima |
| 5,452,259 A | 9/1995 | McLaury |
| 5,473,563 A | 12/1995 | Suh et al. |
| 5,473,566 A | 12/1995 | Rao |
| 5,473,577 A | 12/1995 | Miyake et al. |
| 5,596,724 A | 1/1997 | Mullins et al. |
| 5,602,780 A | 2/1997 | Diem et al. |
| 5,636,342 A | 6/1997 | Jeffries |
| 5,671,178 A | 9/1997 | Park et al. |
| 5,721,840 A | 2/1998 | Soga |
| 5,740,379 A | 4/1998 | Hartwig |
| 5,761,146 A | 6/1998 | Yoo et al. |
| 5,771,199 A | 6/1998 | Lee |
| 5,802,006 A | 9/1998 | Ohta |
| 5,806,070 A | 9/1998 | Norman et al. |
| 5,809,070 A | 9/1998 | Krishnan et al. |
| 5,818,785 A | 10/1998 | Ohshima |
| 5,828,899 A | 10/1998 | Richard et al. |
| 5,835,935 A | 11/1998 | Estakhri et al. |
| 5,859,809 A | 1/1999 | Kim |
| 5,872,994 A | 2/1999 | Akiyama et al. |
| 5,937,425 A | 8/1999 | Ban |
| 5,941,974 A | 8/1999 | Babin |
| 5,954,804 A | 9/1999 | Farmwald et al. |
| 5,959,930 A | 9/1999 | Sakuria |
| 5,995,417 A | 11/1999 | Chen et al. |
| 6,002,638 A | 12/1999 | John |
| 6,009,479 A | 12/1999 | Jeffries |
| 6,085,290 A | 7/2000 | Smith et al. |
| 6,091,660 A | 7/2000 | Sasaki et al. |
| 6,107,658 A | 8/2000 | Itoh et al. |
| 6,144,576 A | 11/2000 | Leddige et al. |
| 6,148,364 A | 11/2000 | Srinivasan et al. |
| 6,178,135 B1 | 1/2001 | Kang |
| 6,304,921 B1 | 10/2001 | Rooke |
| 6,317,350 B1 | 11/2001 | Pereira et al. |
| 6,317,352 B1 | 11/2001 | Halbert et al. |
| 6,317,812 B1 | 11/2001 | Lofgren et al. |
| 6,438,064 B2 | 8/2002 | Ooishi |
| 6,442,098 B1 | 8/2002 | Kengeri |
| 6,442,644 B1 | 8/2002 | Gustavson et al. |
| 6,453,365 B1 | 9/2002 | Habot |
| 6,535,948 B1 | 3/2003 | Wheeler et al. |
| 6,567,904 B1 | 5/2003 | Khandekar et al. |
| 6,584,303 B1 | 6/2003 | Kingswood et al. |
| 6,594,183 B1 | 7/2003 | Lofgren et al. |
| 6,601,199 B1 | 7/2003 | Fukuda et al. |
| 6,611,466 B2 | 8/2003 | Lee et al. |
| 6,658,509 B1 | 12/2003 | Bonella et al. |
| 6,658,582 B1 | 12/2003 | Han |
| 6,680,904 B1 | 1/2004 | Kaplan et al. |
| 6,715,044 B2 | 3/2004 | Lofgren et al. |
| 6,718,432 B1 | 4/2004 | Srinivasan |
| 6,732,221 B2 | 5/2004 | Ban |
| 6,741,486 B2 | 5/2004 | Sakui |
| 6,754,807 B1 | 6/2004 | Parthasarathy et al. |
| 6,763,426 B1 | 7/2004 | James et al. |
| 6,807,103 B2 | 10/2004 | Cavaleri et al. |
| 6,816,933 B1 | 11/2004 | Andreas |
| 6,850,443 B2 | 2/2005 | Lofgren et al. |
| 6,853,557 B1 | 2/2005 | Haba et al. |
| 6,853,573 B2 | 2/2005 | Kim et al. |
| 6,928,501 B2 | 8/2005 | Andreas et al. |
| 6,944,697 B2 | 9/2005 | Andreas |
| 6,950,325 B1 | 9/2005 | Chen |
| 6,967,874 B2 | 11/2005 | Hosono |
| 6,996,644 B2 | 2/2006 | Schoch et al. |
| 7,032,039 B2 | 4/2006 | DeCaro |
| 7,043,630 B1 | 5/2006 | Xia |
| 7,073,022 B2 | 7/2006 | El-Batal et al. |
| 7,161,842 B2 | 1/2007 | Park et al. |
| 7,356,639 B2 | 4/2008 | Perego et al. |
| 2002/0188781 A1 | 12/2002 | Schoch et al. |
| 2003/0074505 A1 | 4/2003 | Andreas et al. |
| 2003/0128702 A1 | 7/2003 | Satoh et al. |
| 2003/0221061 A1 | 11/2003 | El-Batal et al. |
| 2004/0001380 A1 | 1/2004 | Becca et al. |
| 2004/0019736 A1 | 1/2004 | Kim et al. |
| 2004/0024960 A1 | 2/2004 | King et al. |
| 2004/0039854 A1 | 2/2004 | Estakhri et al. |
| 2004/0148482 A1 | 7/2004 | Grundy et al. |
| 2004/0199721 A1 | 10/2004 | Chen |
| 2004/0230738 A1 | 11/2004 | Lim et al. |
| 2004/0256638 A1 | 12/2004 | Perego et al. |
| 2005/0120136 A1 | 6/2005 | Park et al. |
| 2005/0160218 A1 | 7/2005 | See et al. |
| 2005/0213421 A1 | 9/2005 | Polizzi et al. |
| 2006/0031593 A1 | 2/2006 | Sinclair |
| 2006/0050594 A1 | 3/2006 | Park |
| 2008/0086590 A1 | 4/2008 | Urabe |

OTHER PUBLICATIONS

Toshiba, "2GBIT (256M×8 Bits) CMOS NAND E2PROM", TH58NVG1S3AFT05, May 19, 2003, pp. 1-32.

Atmel Corp., "High Speed Small Sectored SPI Flash Memory", Sep. 2006, pp. 1-22.

64 Megabit CMOS 3.0 Volt Flash Memory with 50MHz SPI, Spansion, Sep. 6, 2006, pp. 1-22.

Intel Corporation, "Intel® Advanced+ Boot Block Flash Memory (C3)", May 2005, pp. 1-72.

M-Systems Flash Disk Pioneers Ltd., "DiskOnChip H1 4Gb (512MByte) and 8Gb (1 GByte) High Capacity Flash Disk with NAND and x2 Technology", Data Sheet, Rev. 0.5 (Preliminary), Jul. 2005, pp. 1-66.

Tal, A., "Guidelines for Integrating DiskOnChip in a Host System", AP-DOC-1004, Rev. 1.0, M-Systems Flash Pioneers Ltd., Aug. 2004, pp. 1-15.

Samsung Electronics Co. Ltd, OneNAND4G(KFW4G16Q2M-DEB6), OneNAND2G(KFH2G16Q2M-DEB6), OneNAND1G(KFW1G16Q2M-DEB6) Flash Memory, OneNAND™ Specification Ver. 1.2, pp. 1-125, Dec. 23, 2005.

Kennedy, J., et al., "A 2Gb/s Point-to-Point Heterogeneous Voltage Capable DRAM Interface for Capacity-Scalable Memory Subsystems", ISSCC 2004/Session 1/DRAM/11.8, IEEE International Solid-State Circuits Conference, Feb. 15-19, 2004, vol. 1, 10 pages.

Kim, Jae-Kwan et al., "A 3.6Gb/s/pin Simultaneous Bidirectional (SBD) I/O Interface for High-Speed DRAM", ISSCC 2004/Session 22/DSL and Multi-Gb/s I/O 22.7, IEEE International Solid-State Circuits Conference Feb. 15-19, 2004, vol. 1, pp. 414-415.

"HyperTransport TM I/O Link Specification", Revision 2.00, Document No. HTC20031217-0036-00, Hypertransport Technology Consortium, republished as Revision 2.0b, Apr. 27, 2005, pp. 1-325.

"IEEE Standard for High-Bandwidth Memory Interface Based on Scalable Coherent Interface (SCI) Signaling Technology (RamLink)", IEEE Std. 1596.4-1996, The Institute of Electrical Electronics Engineers, Inc., Mar. 1996, pp. i-91.

Oshima, et al., "High-Speed Memory Architectures for Multimedia Applications", Circuits & Devices, IEEE 8755-3996/97, pp. 8-13, Jan. 1997.

Gjessing, S., et al., "RamLink: A High-Bandwidth Point-to-Point Memory Architecture", Proceedings CompCom 1992, IEEE 0-8186-2655-0/92, pp. 328-331, Feb. 24-28, 1992.

Gjessing, S., et al., "Performance of the RamLink Memory Architecture", Proceedings of the Twenty-Seventh Annual Hawaii International Conference on System Sciences, IEEE 1060-3425/94, pp. 154-162, Jan. 1994.

Gjessing, S., et al., "A RAM Link for High Speed", Special Report/Memory, IEEE Spectrum, pp. 52-53, Oct. 1992.

Diamond, S.L., "SyncLink: High: High-speed DRAM for the Future", Micro Standards, IEEE Micro, pp. 74-75, Dec. 1996.

Samsung Electronics, "DDR2 Fully Buffered DIMM 240pin FBDIMMS based on 512Mb C-die" Rev. 1.3, Sep. 2006, pp. 1-32, Sep. 2006.

"HyperTransport TM I/O Link Specification", Revision 3.00, Document No. HTC20051222-0046-0008, Hypertransport Technology Consortium, pp. 1-428, Apr. 2006.

"8-megabit 2.5-volt Only or 2.7-volt Only DataFlash®," Technical Specification, Atmel, Rev. 2225H-DFLSH, Oct. 2004.

Samsung Electronics, "K9XXG08UXM Preliminary Flash Memory," Technical Specification, Samsung Electronics, May 3, 2005.

"1024K12C™ CMOS Serial EEPROM," Technical Specification, Microchip Technology Inc., Feb. 16, 2006.

"The I2C-Bus Specification," Version 2.1, Philips Semiconductors, Jan. 2000.

"16 Mbit LPC Serial Flash," Preliminary Specification, Silicon Storage Technology Inc., Sep. 2006.

"16 Mbit SPI Serial Flash," Preliminary Specification, Silicon Storage Technology Inc., Apr. 2005.

"2Mbit, Low Voltage, Serial Flash Memory with 40 Mhz SPI Bus Interface," Technical Specification, STMicroelectronics Group of Companies Aug. 2005.

"NAND Flash Applications Design Guide," Revision 1.0, Toshiba America Electronics Components, Inc., Apr. 2003.

McVey, JM "Programmable Identification for I/O Device", IBM Technical Disclosure Bulletin, Aug. 1979.

U.S. Appl. No. 11/624,929, Office Action dated Jul. 22, 2009.

U.S. Appl. No. 11/624,929, Office Action dated Feb. 4, 2010.

Craig et al., Microchip Technology Inc., "Communicating with Daisy Chained MCP42XXX Digital Potentiometers", Jan. 30, 2001, pp. 1-8.

PCT Patent Application No. PCT/CA2007/002173 International Search Report Dated Apr. 7, 2008.

PCT Patent Application No. PCT/CA2007/002171 International Search Report dated Mar. 17, 2008.

PCT Patent Application No. PCT/CA2007/002193 International Search Report Dated Apr. 7, 2008.

PCT Patent Application No. PCT/CA2007/002182 International Search Report dated Mar. 18, 2008.

PCT Patent Application No. PCT/CA2007/002147 Written Opinion dated Mar. 10, 2008.

U.S. Appl. No. 11/622,828, Notice of Allowance dated May 21, 2012.

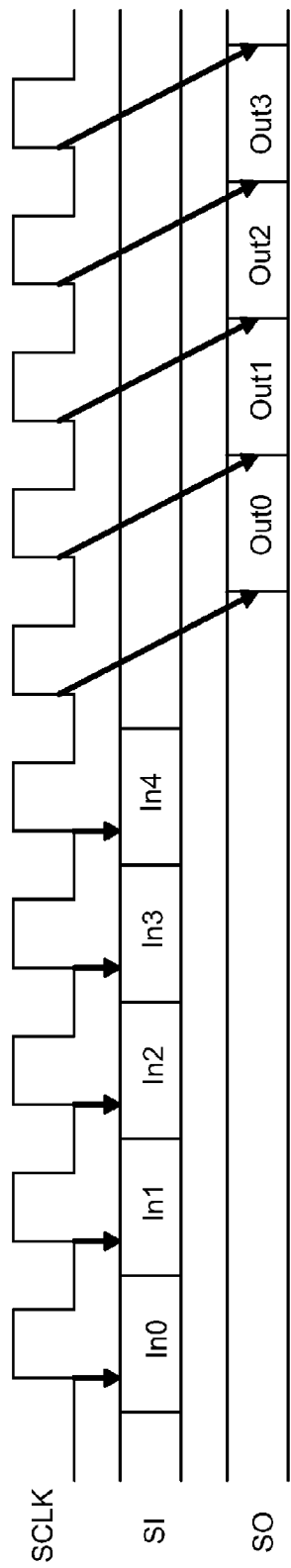
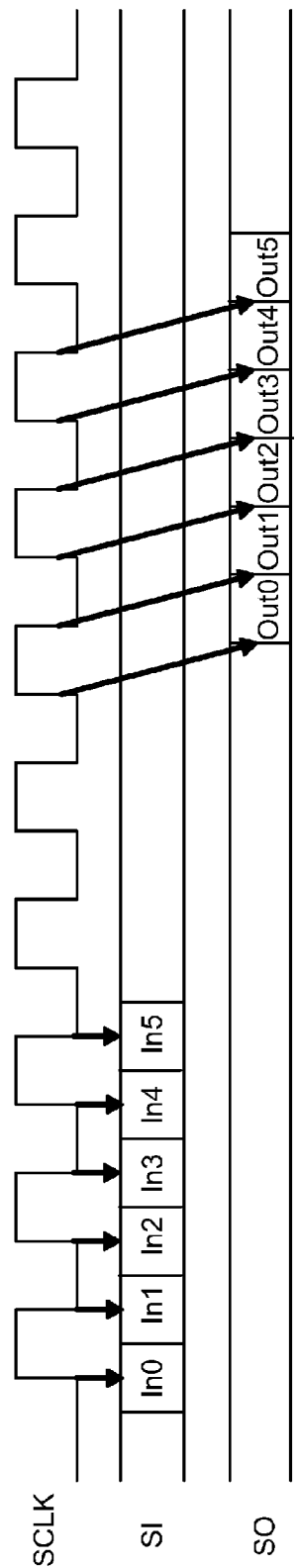
FIG. 2A
FIG. 2B

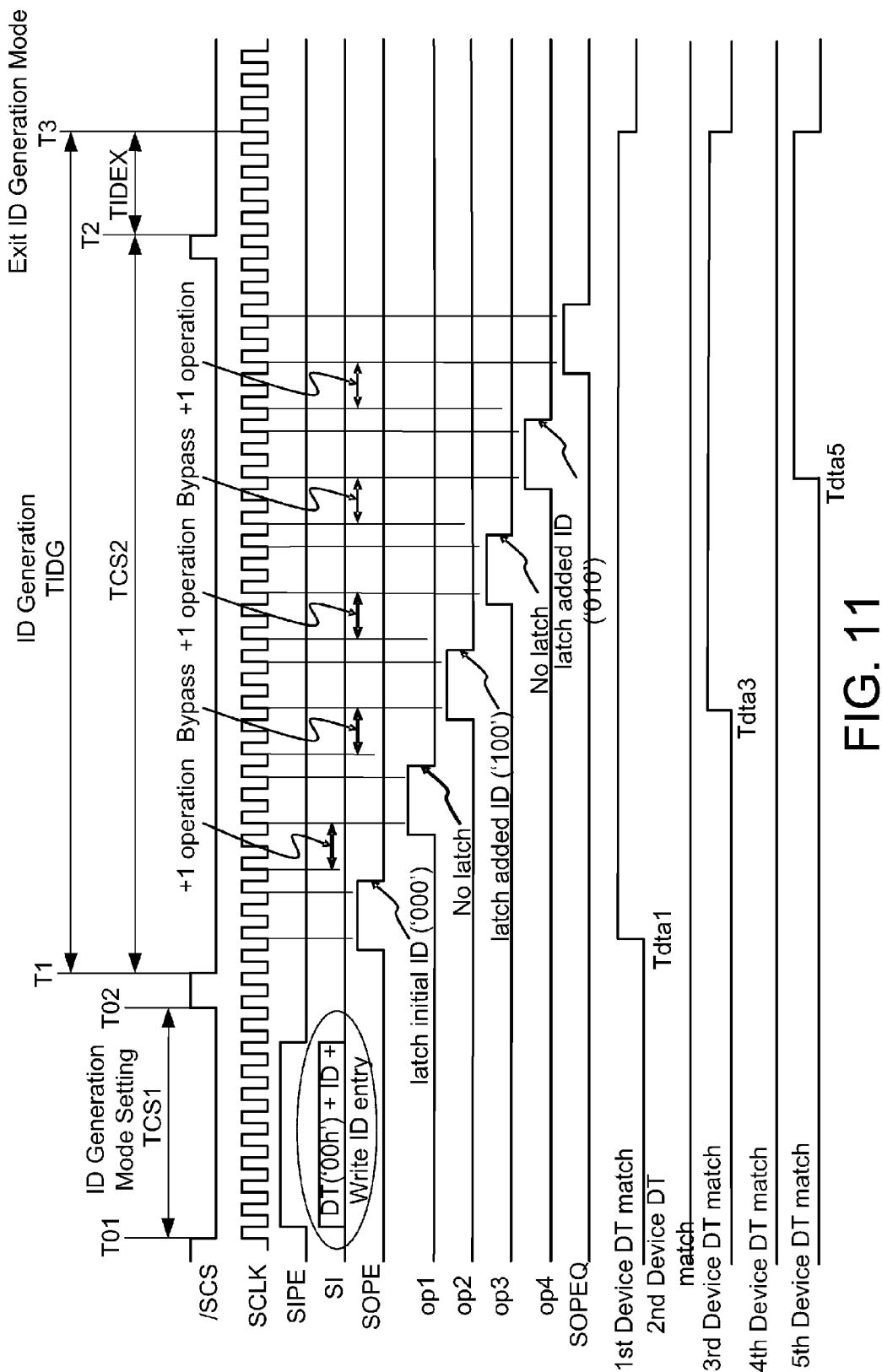

APPARATUS AND METHOD FOR PRODUCING IDS FOR INTERCONNECTED DEVICES OF MIXED TYPE

CROSS REFERENCE TO RELATED APPLICATIONS

This application is a continuation of U.S. patent application Ser. No. 11/622,828 filed Jan. 12, 2007, now U.S. Pat. No. 8,271,758, with the benefit of priority from U.S. Provisional Application No. 60/870,892, filed Dec. 20, 2006, and of U.S. Provisional Application No. 60/868,773, filed Dec. 6, 2006. The disclosures of all of the above applications are expressly incorporated herein by reference in their entirety.

FIELD OF THE INVENTION

The present invention relates generally to memory systems. More particularly, the present invention relates to an apparatus and a method for producing device identifiers for a serial interconnection of devices of mixed type.

BACKGROUND OF THE INVENTION

Current consumer electronic equipment uses memory devices. For example, mobile electronic devices such as digital cameras, portable digital assistants, portable audio/video players and mobile terminals continue to require mass storage memories, preferably non-volatile memory with ever increasing capacities and speed capabilities. Non-volatile memory and hard disk drives are preferred since data is retained in the absence of power, thus extending battery life.

While existing memory devices operate at speeds sufficient for many current consumer electronic devices, such memory devices may not be adequate for use in future electronic devices and other devices where high data rates are desired. For example, a mobile multimedia device that records high definition moving pictures is likely to require a memory module with a greater programming throughput than one with current memory technology. While such a solution appears to be straightforward, there is a problem with signal quality at such high frequencies, which sets a practical limitation on the operating frequency of the memory. The memory communicates with other components using a set of parallel input/output (I/O) pins, the number of which depends on the desired configuration. The I/O pins receive command instructions and input data and provides output data. This is commonly known as a parallel interface. High speed operation may cause deleterious communication effects such as, for example, cross-talk, signal skew and signal attenuation, which degrade signal quality.

In order to incorporate higher density and faster operation on the system boards, there are two design techniques: serial interconnection and multi-drop configurations. These design techniques may be used to overcome the density issue that determines the cost and operating efficiency of memory swapping between a hard disk and a memory system. However, multi-drop configurations have shortcomings relative to the serial interconnection of memory systems. For example, if the number of multi-drop memory systems increases, as a result of loading effect of each pin, delay time also increases so that the total performance of multi-drop is degraded by the multi-drop connection caused by the wire resistor-capacitor loading and the pin capacitance of the memory device. A serial link in a device such as a memory device may utilize a single pin input that receives all addresses, commands, and data serially. The serial link may provide a serial interconnection configuration to control command bits, address bits, and data bits effectively through the serial interconnection. By providing a serial interconnection configuration, a device identifier is assigned to each of the connected devices.

SUMMARY OF THE INVENTION

In accordance with one aspect of the present invention, there is provided a system comprising a plurality of memory devices including at least first and second devices in a serial interconnection configuration, the first device having serial input and output connections, the second device having a serial input connection, the serial input connection of the first device being coupled to a serial output connection of a previous device, the serial output connection of the first device being coupled to the serial input connection of the second device. The first device includes: a receiver for receiving a device identifier (ID) and a device type (DT) through the serial input connection thereof; a determiner for determining the device type from the received DT; and an ID assignor for assigning an ID in response to a determination result.

For example, the ID assignor includes a calculator for performing the calculation of the ID based on the received ID and a pre-defined value. The calculator may be an adder that adds one to the ID or a subtractor that subtracts one from the ID.

The first device may further include a device information provider for providing device type information (DTI) of the device. For example, the determiner includes a comparator for comparing the DT with the provided DTI to provide the determination result.

Advantageously, the ID assignor includes a selector for selecting one of the calculated ID and the received ID depending upon the determination result. The selected ID is outputted through the serial output connection of the device. The device information provider may include an information storage for storing the device type information on types of the plurality of memory devices, the device type information being provided in parallel manner to the selector.

Advantageously, the plurality of memory devices in the serial interconnection configuration includes mixed type memory devices, the memory devices including, such as random access memories (e.g., DRAMs, SRAMs, MRAMs) and Flash memories (e.g., NAND-type, NOR-type, AND-type Flash memories). The information storage may include a storage that is capable of storing the device type information of the mixed type memory devices and providing one of the device type information corresponding to a selected one of the memory devices.

In accordance with another aspect of the present invention, there is provided a method for assigning a device identifier at a first device coupled to a second device in a serial interconnection configuration, the first device having a serial input connection coupled to a serial output connection of a previous device in the serial interconnection configuration, the second device having a serial input connection coupled to a serial output connection of the first device. The method includes: receiving device identifier (ID) and a device type (DT) through the serial input connection of the first device; determining the DT of the device from the received DT; and providing an ID in response to a determination result.

Advantageously, the step of providing the ID includes performing the calculation of the received ID with a pre-defined value to provide a calculated ID. The method may include the step of providing device type information (DTI) of the device.

Advantageously, the step of determining the DT includes comparing the DT with the provided DTI to provide the determination result. The step of providing the ID includes selecting one of the received ID and the calculated ID depending upon the determination result. The selected ID is outputted as a new ID through the serial output connection of the device.

In accordance with a further aspect of the present invention, there is provided an apparatus for producing a device identifier at a first device coupled to a second device in a serial interconnection configuration, the first device having a serial input connection coupled to a serial output connection of a previous device in the serial interconnection configuration, the second device having a serial input connection coupled to a serial output connection of the first device. The apparatus includes: a receiver for receiving a device identifier (ID) and a device type (DT) through the serial input connection of the first device; a determiner for determining the DT of the device from the received DT; and an ID producer for producing an ID in response to a determination result.

The ID producer may include a calculator for performing the calculation of the received ID with a pre-defined value. The apparatus may include a device type producer for providing device type information (DTI) of the device.

For example, the determiner includes a comparator for comparing the received DT with the provided DTI to provide the determination result. The ID producer further includes a selector for selecting one of the received ID and the calculated ID depending upon the determination result. The selected ID is outputted through the serial output connection of the device.

Advantageously, the receiver includes: a register for registering the received ID and DT in serial manner; and an output provider for outputting each of the registered ID and DT in parallel manner. The ID and DT are provided separately by the receiver for calculating the ID and for selecting one of the pre-calculated ID and the calculated ID, respectively.

The apparatus may further include: a storage that is capable of storing the device type information on types of the plurality of memory devices; and a provider for providing the device type information of the devices for the determination.

In accordance with yet a further aspect of the present invention, there is provided a method for determining a device identifier of one of a plurality of devices in a serial interconnection configuration, the method comprising: receiving a first value corresponding to a device identifier (ID) and a second value corresponding to a device type (DT); comparing the second value to a device type number (DTN) stored at a first device; and producing a match signal that indicates whether the second value corresponds to the DTN.

The method may further include generating an ID responsive to the received ID. One of the generated ID and the received ID is selected to output a selected ID. A signal corresponding to the selected ID is transmitted to a second device.

Advantageously, in response to the match signal, the generated ID or the received ID is written into an ID register at the first device.

In accordance with yet a further aspect of the present invention, there is provided an apparatus for assigning a device identifier for use in a plurality of mixed type memory devices in a serial interconnection configuration, a first device having a serial input connection coupled to a serial output connection of a previous device, a second device having a serial input connection coupled to a serial output connection of the first device. The apparatus includes: a determiner for determining a received device type (DTsi) based on a device type (DT) in the serial interconnection configuration; and an ID producer for producing a device identifier (ID) in response to a determination result.

The apparatus may further include a receiver for receiving the ID and the DT through the serial input connection of the device. Advantageously, the ID producer includes a calculator for performing the calculation of the received ID with a pre-defined value. The apparatus may further include a device information provider for providing device type information (DTI) of the first device.

For example, the determiner includes: a comparator for comparing the DTsi with the provided DTI to provide the determination result. The ID producer includes a selector for selecting one of the received ID and the calculated ID depending upon the determination result. The selected ID is outputted through the serial output connection of the device.

For example, the device information provider includes a storage that is capable of storing the device type information of the memory devices and is capable of providing the device type information corresponding to a selected one of the memory devices. The device type information of the memory devices may include DRAM, SRAM, MRAM and NAND-, NOR- and AND-type Flash memories.

In accordance with yet a further aspect of the present invention, there is provided a method for assigning a device identifier at a first device coupled to a second device in a serial interconnection configuration, the first device having a serial input connection coupled to a serial output connection of a previous device in the serial interconnection configuration, the second device having a serial input connection coupled to a serial output connection of the first device. The method includes: receiving a device type (DT) through the serial input connection of the first device; determining the DT of the first device from the received DT; receiving a device identifier (ID) through the serial input connection of the first device; and producing an ID in response to the determination result.

The method may further include: holding the received DT; and holding the received ID. For example, the step of determining the DT includes providing a reference DT of the first device. The reference DT is compared with the held DT to provide the determination result. Advantageously, in response to the determination result, the calculation of the received ID with a pre-defined value is performed to provide a calculated ID. One of the held ID and the calculated ID is selected depending upon the determination result. The selected ID is outputted as a new ID through the serial output connection of the first device.

In accordance with yet a further aspect of the present invention, there is provided a method for assigning a device identifier for a plurality of mixed type memory devices in a serial interconnection configuration, a first device having a serial input connection coupled to a serial output connection of a previous device, a second device having a serial input connection coupled to a serial output connection of the first device. The method includes: receiving a device type (DT); holding the received DT at each of the devices; determining whether the DT matches a reference DT associated with each of the devices; providing a device identifier (ID) to one of the devices, through the serial input connection of the device; and at the device wherein the ID is provided, conducting an ID assignment in response to the determination result at that device.

Advantageously, the step of providing an ID includes providing the DT to the devices by serially transferring it from one device to a last device. For example, the step of holding the received DT is performed after the step of providing the DT. The step of determining the match is performed before the step of conducting the ID assignment at all of the devices. At each of the devices, the step of conducting the ID assignment is performed based on the previous determination result.

In some embodiments, the step of holding the received DT is performed after the step of providing the DT. The step of conducting the ID assignment is performed at each of the devices in response to the determination result. The step of conducting the ID assignment may include performing the calculation of the ID based on the provided ID and a predefined value; and passing the provided ID without altering it. Advantageously, at the device wherein the ID is provided, the calculated ID is outputted for another device (e.g., a next device) and the non-altered ID is outputted for the device.

In accordance with yet a further aspect of the present invention, there is provided a system comprising: a control signal provider for providing control signals; and a plurality of memory devices in a serial interconnection configuration, a first device having a serial input connection coupled to a serial output connection of a previous device, a second device having a serial input connection coupled to a serial output connection of the first device, the devices being controlled in response to the control signals.

In accordance with an embodiment of the present invention, there is provided an ID generation with skip function for serially interconnected memory devices of mixed type, in accordance with the device types.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein:

FIG. 2A is a timing diagram of single data rate operation of memory devices;

FIG. 2B is a timing diagram of double data rate operation of memory devices;

FIG. 11 is a timing diagram of the ID generation in the serial interconnection to where the ID generator shown in FIG. 10 is applied;

DETAILED DESCRIPTION

Figure 1A:
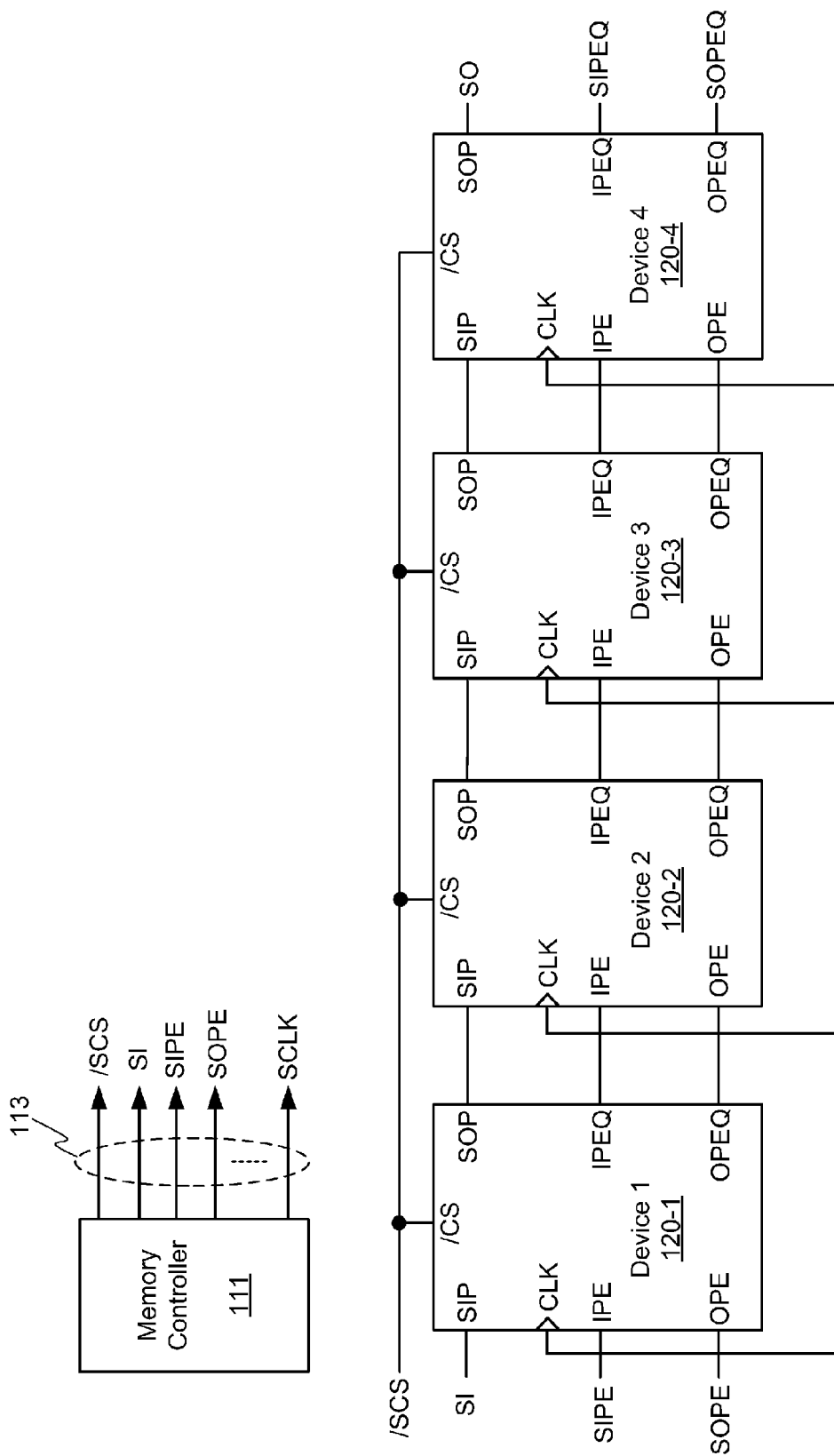
FIG. 1A is a block diagram illustrating memory devices employing a serial interconnection implementation to which embodiments of the present invention are applied.

In the following detailed description of embodiments of the present invention, reference is made to the accompanying drawings which form a part hereof, and in which is shown by way of illustration of specific embodiments in which the present invention may be practiced. These embodiments are described in sufficient detail to enable those of ordinary skill in the art to practice the present invention, and it is to be understood that other embodiments may be utilized and that logical, electrical, and other changes may be made without departing from the scope of the present invention. The following detailed description is, therefore, not to be taken in a limiting sense, and the scope of the present invention is defined by the appended claims.

Generally, the present invention provides an apparatus and a method for processing and capturing serial input data with ID generation in serially interconnected devices.

Some memory subsystems employ multiple Flash devices with serial interfaces. Here, the command string may be fed to all of the devices even though the command may only be performed on one of the devices. To select the device on which the command is to be performed, the command string may contain a device identifier (ID) that identifies the Flash device to which the command is directed. Each device receiving the command string compares the ID contained in the command string to an ID associated with the device. If the two match, the device assumes that the command is directed to itself and executes the command.

A problem with the above-described arrangement involves establishing an ID for each device. One technique that may be used to establish an ID for a device is to hardwire an internal unique ID into the device. One drawback with this approach, however, is that if large numbers of devices are used, the size of the ID may have to be quite long in order to ensure that each device contains a unique ID. Managing a large-sized device ID may add significant complexity to the device, which in turn may increase the cost of producing the device. In addition, reclaiming device IDs that are associated with devices that are no longer in use may further add to the complexity of this scheme.

Another approach to assigning IDs to devices involves externally hardwiring an ID for each device. Here, the ID may be specified by wiring various pins on the device to certain states to establish an ID for the device. The device reads the wired state of the pins and establishes its ID from the read state. One drawback with this approach, however, is that external wiring is needed to assign the ID for each device. This may add to the complexity of, e.g., printed circuit boards (PCBs) that hold the memory devices. Another drawback with this approach is that it may require pins to be dedicated for the assignment of the ID. This may consume precious resources that may be otherwise better used. In addition, dedicating pins for the assignment of the ID may require a greater footprint for the device than if pins were not used to assign the ID.

At least some embodiments of the present invention address at least some of these shortcomings. At least some example embodiments automatically establish an ID for a device, for example, in a serial interconnection arrangement, in a manner that does not require special internal or external hardwiring of the ID. According to one aspect of the techniques described herein, an input signal is transmitted through a serial interconnection to a first device in an arrangement including multiple devices (e.g., a serial interconnection arrangement) using inputs that are also used by the first device to input other information to the device (e.g., data, commands, control signals). A generator generates a device ID in response to the input signal. A transferor then transfers an output signal associated with the ID to a second memory device through a serial output of the first device. The serial output may also be used by the first device to output other information (e.g., signals, data) to other devices in the arrangement.

In an embodiment of the techniques described herein, a write ID operation is initiated at a device in a serial interconnection arrangement to cause the device to establish an ID. A first device receives a first value by acquiring the state of one or more inputs of the first device. The first device then establishes a device ID from the first value, which may include placing the first value in storage (e.g., a device ID register) associated with the device. The first device generates a second value from the acquired state of the inputs. The first device outputs the second value from the first device via outputs of the first device to a second device in the serial interconnection. The second device inputs the value output by the first device and repeats this process to establish an ID.

Embodiments of the present invention will now be described in conjunction with a MISL (multiple independent serial link). A MISL product is an item in the Flash memory area that enhances the operation performance without change to the core structure. It is an innovation of interface and data processing of Flash memories. Due to the restriction of Flash cell structure and limited performance of the cell, the enhancement of Flash performance has been a key issue to be resolved in the memory industry. Most products including Flash memory core have parallel ports that latch simultaneously all address bits, all command bits, and all data bits, respectively. A serial link utilizes a single pin input for receiving all address, command, and data serially. Details of MISL are described in U.S. patent application Ser. No. 11/324,023 filed Dec. 30, 2005; U.S. Provisional Patent Application No. 60/787,710 entitled "Serial interconnection of Memory Devices" filed Mar. 28, 2006; and U.S. Provisional Patent Application No. 60/802,645 entitled "Serial interconnection of Memory Devices" filed May 23, 2006, the contents of which are entirely incorporated herein by reference.

FIG. 1A shows an exemplary device configuration including a plurality of single port devices configured in a serial interconnection arrangement having inputs and outputs for various signals, together with a memory controller. In this example, the device configuration includes four memory devices 1, 2, 3 and 4 (120-1, 120-2, 120-3 and 120-4). Each of the interconnected devices 120-1-120-4 has the same structure. A memory controller 111 provides a group of signals 113 containing chip select /SCS, serial input SI, input port enable SIPE, output port enable SOPE, clock SCLK, and other control and data information (not shown) that are provided to the devices.

Figure 1B:
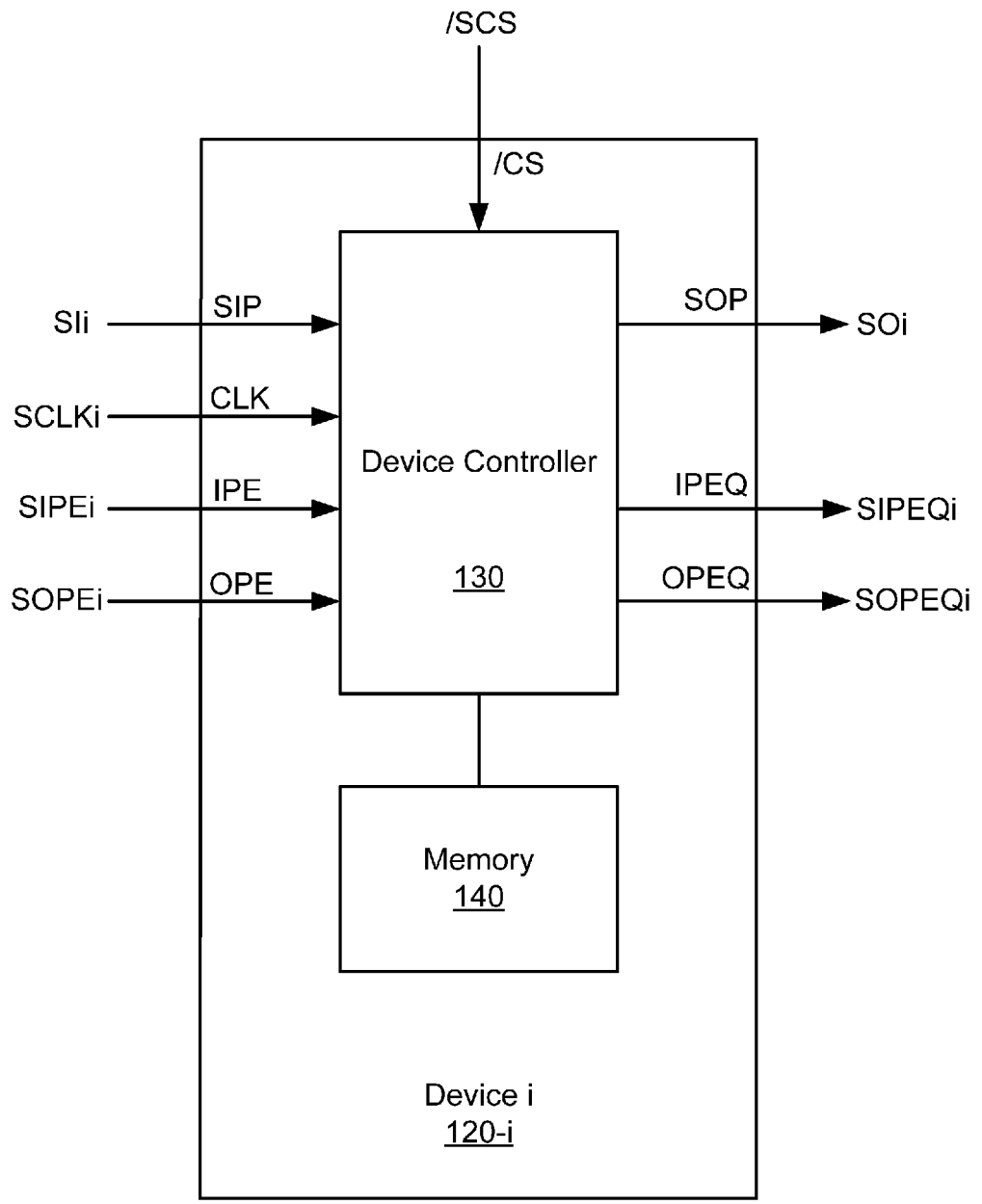
FIG. 1B is a block diagram illustrating one of the devices shown in FIG. 1A.

FIG. 1B shows one device 120-$i$ representing any one of the devices 120-1-120-4 shown in FIG. 1A. The device 120-$i$ includes a device controller 130 and a memory 140 including such as, for example, random access memory or Flash memory. For example, the random access memories can be dynamic random access memory (DRAM), static random access memory (SRAM), magnetoresistive random access memory (MRAM) and the Flash memories can be NAND-type, NOR-type, AND-type, and other types of Flash memories. The device 120-$i$ has a serial input port (SIP) connection, a serial output port (SOP) connection, a chip select input (/CS), and a clock input (CLK). The SIP is used to transfer information (e.g., command, address and data information) into the device 120-$i$. The SOP is used to transfer information from the device 120-$i$. CLK receives a clock signal. The /CS receives a chip select signal /SCS, which enables operations at all devices simultaneously. The device controller 130 performs various control and process functions with access to the memory 140 in response to the input signals (e.g., SI, SIPE, SOPE, SCLK), and provides serial output data to the next device 120-($i$+1).

Referring to FIGS. 1A and 1B, the SIP and the SOP are connected between devices in the serial interconnection arrangement such that the SOP of previous device 120-($i$−1) in the serial interconnection is coupled to the SIP of the device 120-$i$ in the serial interconnection. For example, the SOP of device 1, 120-1, is coupled to the SIP of device 2, 120-2. The clock input CLK of each of four devices 120-1-120-4 is fed with the clock signal SCLK from the memory controller 111. The clock signal SCLK is distributed to all devices via a common link. As will be described further below, SCLK is used to, inter alia, latch information input to the device 120-$i$ at various registers contained therein. The /CS is a conventional chip select input for selecting the device. The /CS is coupled to a common link which enables the chip select signal /SCS to be asserted to all of the devices 120-1-120-4 concurrently and consequently selects all of the devices.

In addition, the device 120-$i$ has an input port enable input IPE, an output port enable input OPE, an input port enable output IPEQ and an output port enable output OPEQ. The IPE is used to input the input port enable signal SIPEi to the device 120-$i$. The signal SIPEi is used by the device to enable the SIP such that when the IPE is asserted, information is serially input to the device 120-$i$ via the SIP. Likewise, the OPE is used to input the output port enable signal SOPEi to the device 120-$i$. The signal SOPEi is used by the device to enable the SOP such that when the OPE is asserted, information is serially output from the device 120-$i$ via the SOP. The IPEQ and the OPEQ are outputs that output the signals SIPEQi and SOPEQi, respectively, from the device 120-$i$. The /CS and the CLK are coupled to separate links which distribute the chip select signal /SCS and the clock signal SCLK, respectively, to four devices 120-1-120-4, as described above.

The SIP and the SOP are coupled from previous device 120-(i−1) to next device 120-(i+1) in the serial interconnection arrangement, as described above. Moreover, the IPEQ and the OPEQ of the previous device 120-(i−1) are coupled to the IPE and the OPE, respectively, of the present device 120-i in the serial interconnection. This arrangement allows the signals SIPE and SOPE to be transferred from one device to the next (e.g., device 1, 120-1, to device 2, 120-2) in the serial interconnection configuration.

Information transmitted to the devices 120-1-120-4 can be latched at different times of the clock signal SCLK fed to the CLK. For example, in a single data rate (SDR) implementation, information input to the device 120-i at the SIP can be latched at either the rising or falling edge of the clock signal SCLK. Alternatively, in a double data rate (DDR) implementation, both the rising and falling edges of the clock signal SCLK can be used to latch information input at the SIP. FIG. 2A shows a relative timing sequence for an SDR operation of memory devices. FIG. 2B shows a relative timing sequence for a DDR operation of memory devices. Each of FIGS. 2A and 2B shows operations in one port. In each of the SDR and DDR operations, the chip select signal is commonly connected to enable all devices at the same time, so that input data of the first device is propagated to the last device.

Figure 3A:
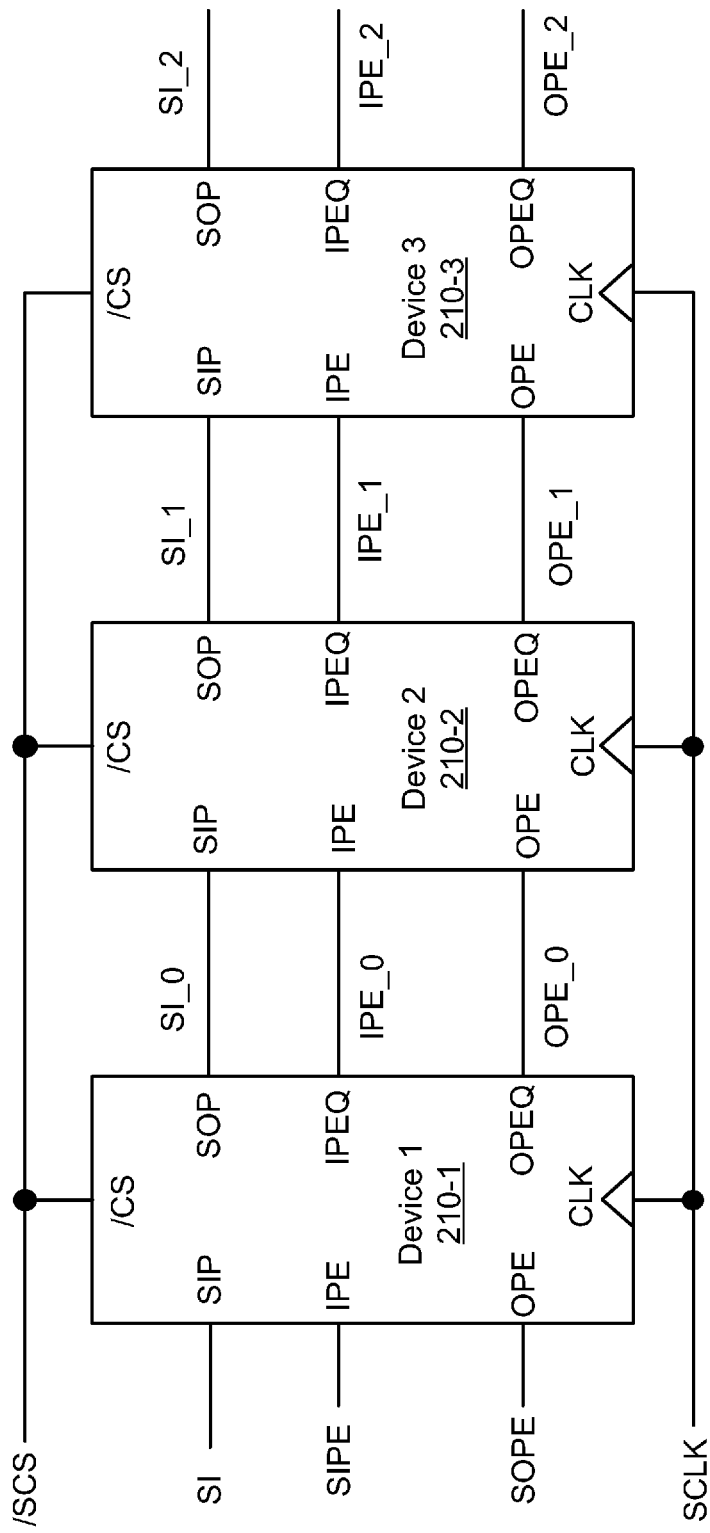
FIG. 3A is a block diagram illustrating a serial interconnection of three memory devices.
Figure 3B:
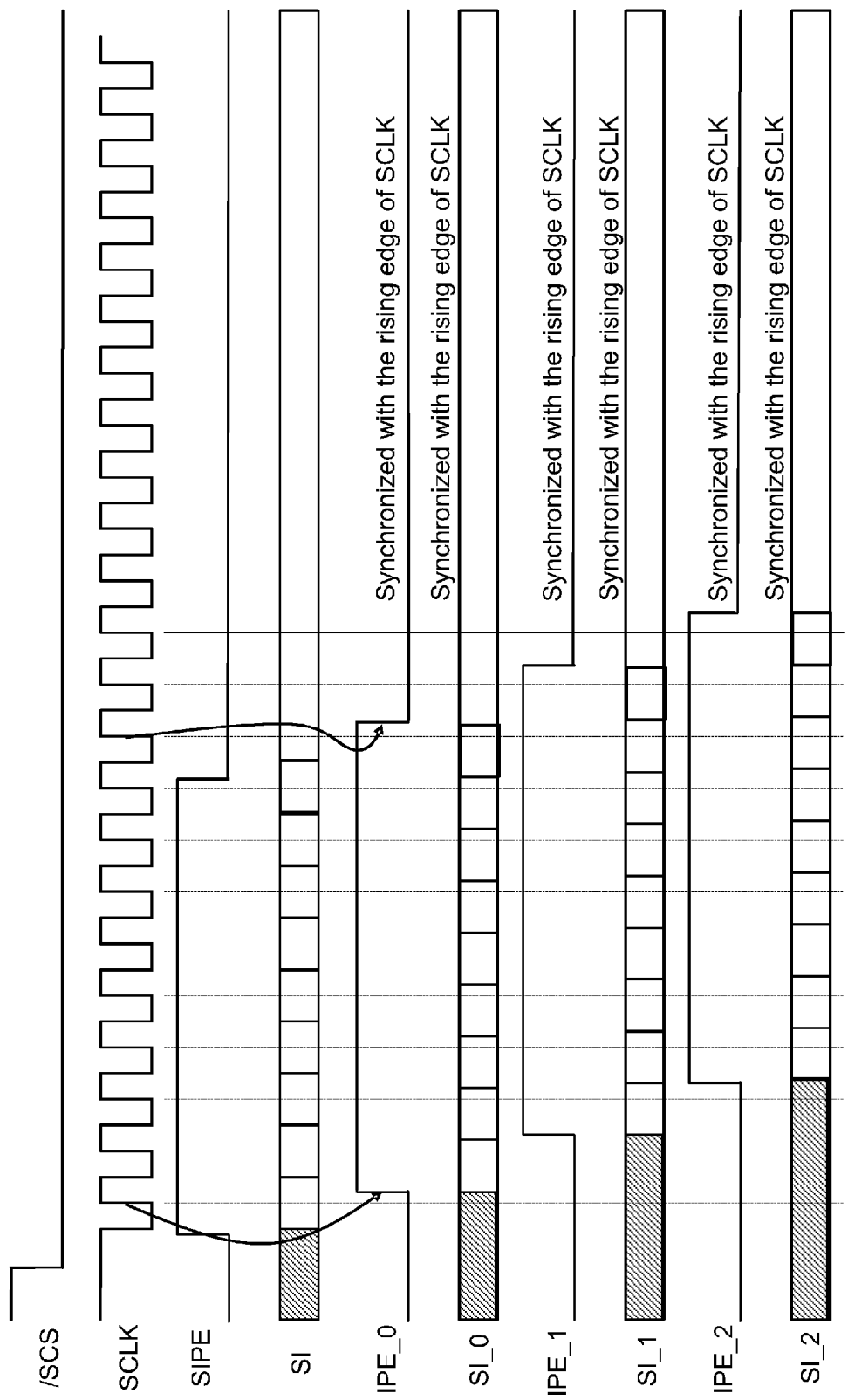
FIG. 3B is a timing diagram illustrating communication between devices shown in FIG. 3A.

FIG. 3A shows three devices 210-1-210-3 configured in a serial interconnection arrangement. FIG. 3B shows signals transferred between the devices 210-1-210-3 shown in FIG. 3A. Referring to FIGS. 3A and 3B, the chip select signal /SCS is first asserted to select the devices. Information is transmitted to device 1, 210-1, in the serial interconnection by asserting the IPE and clocking data into device 210-1 on successive rising edges of the clock signal SCLK. The input port enable signal SIPE is propagated through device 1, 210-1, to device 2, 210-2, in less than a cycle, as shown by the signal IPE_0. Similarly, the output port enable signal SOPE is propagated through device 1 to device 2. The propagation time interval may be varied depending on the system requirements, e.g., a half cycle time interval or a time interval based on a proportion of cycles. The propagation enables information to be clocked from the SOP of device 1, 210-1, to the SIP of device 2, 210-2, at one cycle after the information was clocked into device 1, 210-1. This process is repeated for successive devices in the serial interconnection. For example, information is inputted to device 3, 210-3, in the serial interconnection at the third rising edge of SCLK from the latch point of the data at device 1. The control signals SIPE and SOPE are synchronized with the rising edge of the clock signal SCLK in order to ensure a proper setup time for these signals at the next device in the serial interconnection.

Figure 4A:
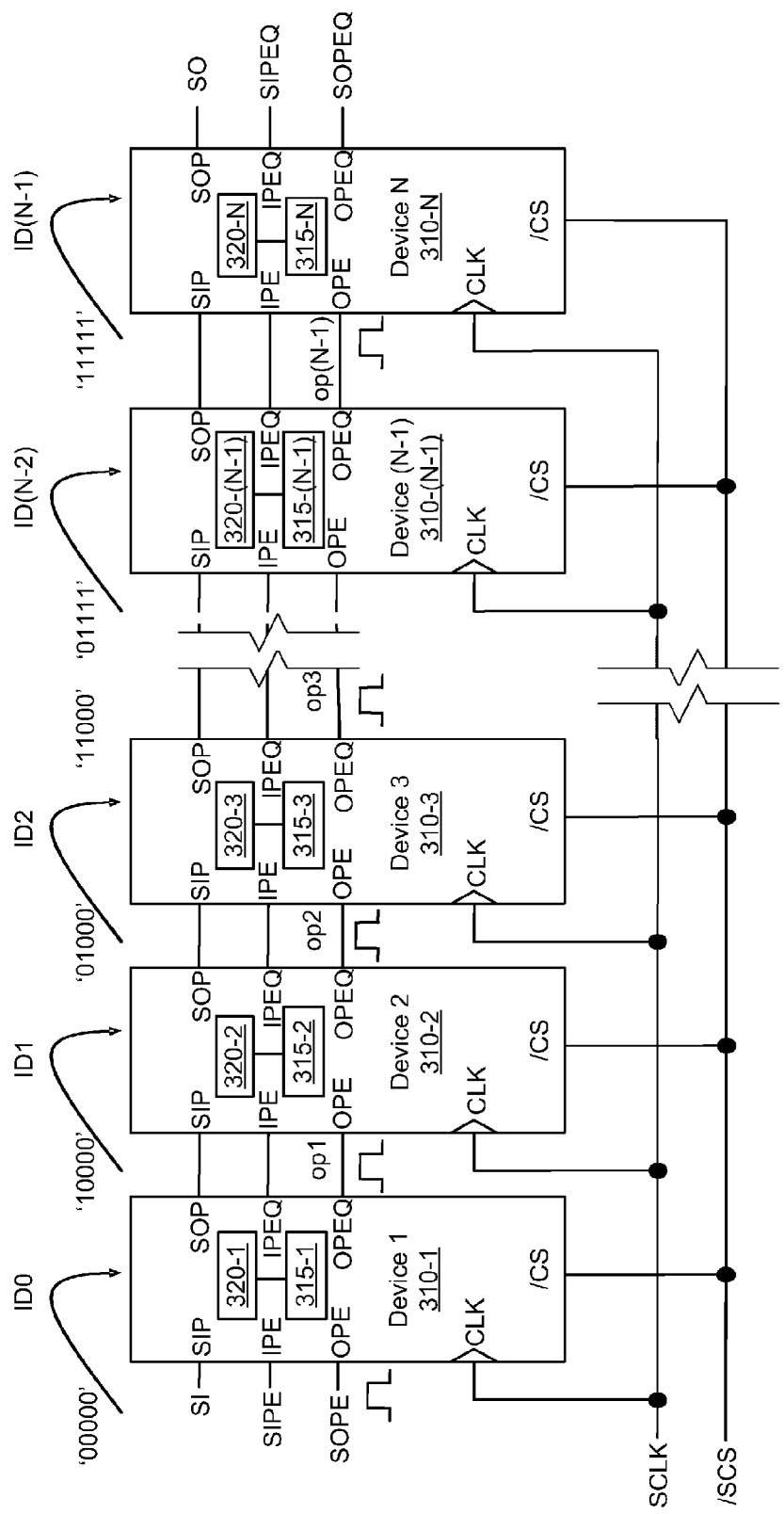
FIG. 4A is a block diagram illustrating a plurality of devices in a serial interconnection operating to establish a device identifier (ID) at each device.
Figure 4B:
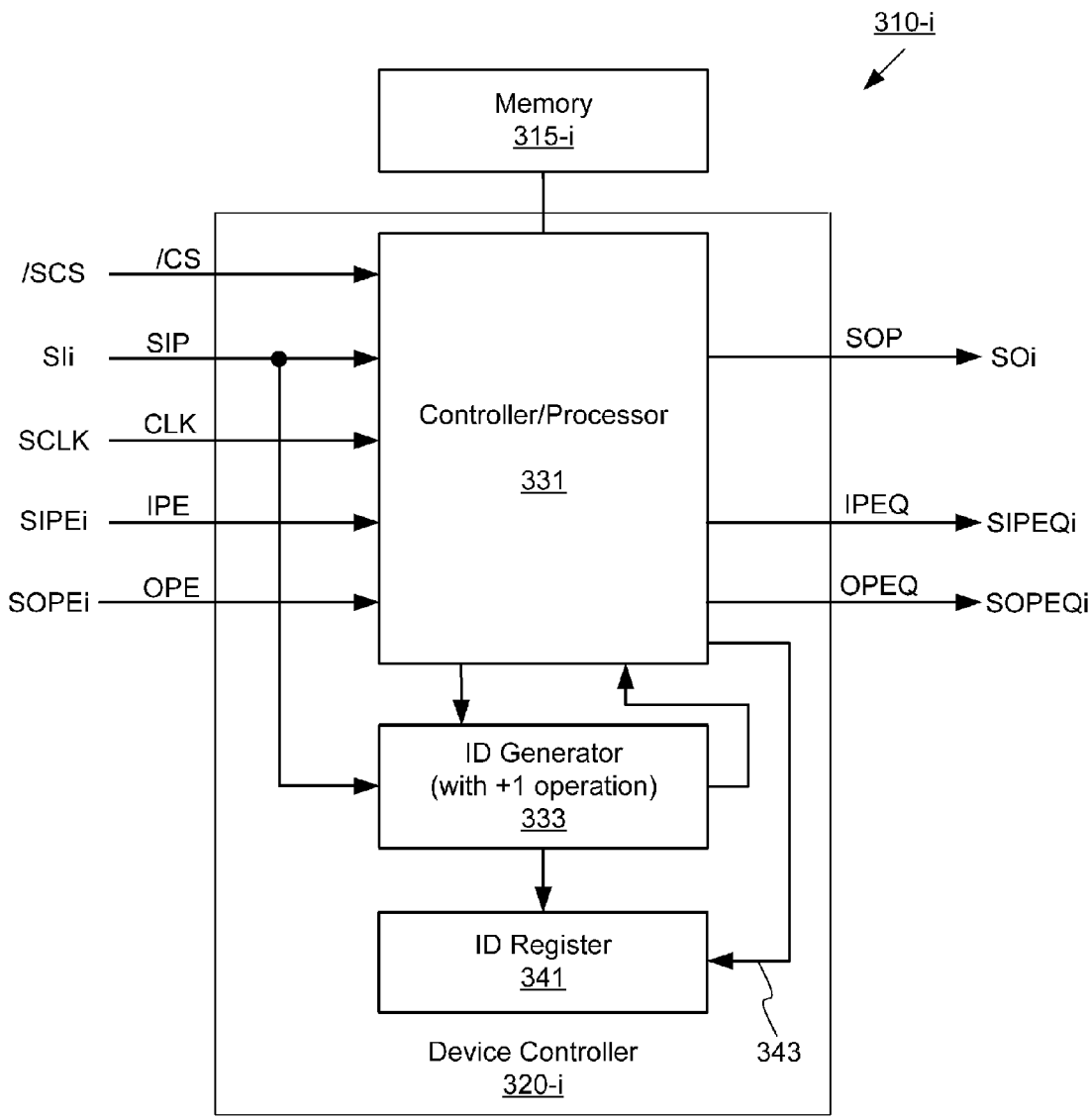
FIG. 4B is a block diagram illustrating one of the devices shown in FIG. 4A.

FIG. 4A shows a plurality of devices in a serial interconnection configuration. Referring to FIG. 4A, N memory devices 310-1-310-N are connected in a single link arrangement and serially interconnected. N devices 310-1-310-N include device controllers 320-1-320-N and memories 315-1-315-N, respectively. A device 310-i is shown in FIG. 4B. The device controller 320-i of the device 310-i is connected to the corresponding memory 315-i. The device controller 320-i includes a controller/processor 331, an ID generator 333 and an ID register 341. The serial input SI to SIP of the device 310i includes the command, device identifier (ID), IDii, and other signal data. The controller/processor 331 receives the serial input SIi, input port enable signal SIPEi, output port enable signal SOPEi and performs control and data processing functions. The ID generator 333 is controlled by the controller/processor 331 and establishes an ID, ID(i+1), for next device 310-(i+1). In response to an ID write enable signal 343 provided by the controller/processor 331, the ID register 341 registers the received ID, IDii, for the present device 310-i. The registered ID is held until powered-off.

Figure 4C:
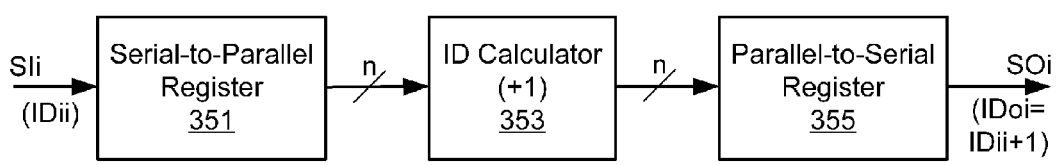
FIG. 4C is a block diagram illustrating an ID generator shown in FIG. 4B.

FIG. 4C shows an example of the ID generator 333 shown in FIG. 4B. Referring to FIG. 4C, the serial input SIi is provided to a serial-to-parallel register 351 of n-bits. The register 351 outputs n-bit IDii to an ID calculator 353 which in turn performs adding (+1) operation. An output signal of the calculator 353 contains a new ID of n-bits, IDii+1, which is provided to a parallel-to-serial register 355. The register 355 provides a serial bit ID, IDi+1, for next device 310-(i+1).

Figure 4D:
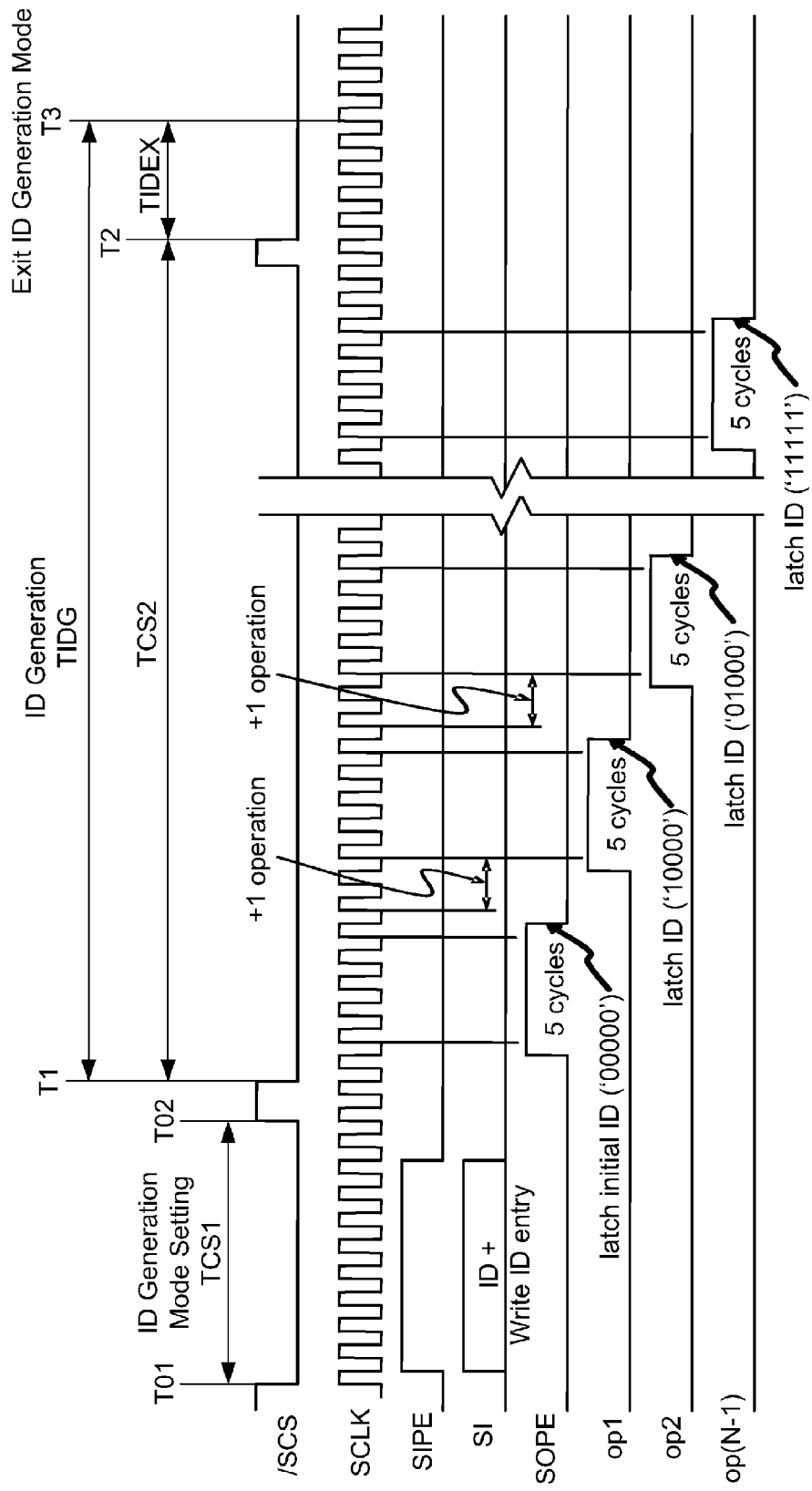
FIG. 4D is a timing diagram of signals transferred between the devices shown in FIG. 4A to establish each ID.

FIG. 4D shows signals transferred between the devices shown in FIG. 4A. This exemplary operation generates IDs in a serial interconnection of a plurality of devices. In the example serial interconnection shown in FIGS. 4A-4D, device logic at IPE includes a function to catch a serial input stream based on the one-byte unit so that OPE is chosen to latch a serial ID input stream after the /SCS signal is "low" again. In FIG. 4D, an ID generation mode setting time period TCS1 between times T01 and T02 is a time interval equivalent to pre-defined clock cycles corresponding to the ID bit length+eight cycles (command bit length)+a considerable number of serially interconnected devices. The commands include an "ID generation" command. The SI contains the ID (initial ID ('00000')) and a "write ID entry" command as an input stream that are caught by IPE during the time period TCS1. TCS1 includes bit cycles of a total number of ID bits, e.g., five cycles. The ID bits are established by the size of an internal ID register. For example, if any device has a 12 bit-ID register, the OPE will hold the "high" state during 12 cycles. This means that 4096 devices are connected physically with a serial interconnection arrangement without any pin limitation like the above mentioned implementation which makes use of existing pins to send the ID number parallelly and asynchronously. After the completion of the ID generation mode setting process, the ID generation operation starts at time T1 and ends with an expiration of time period TIDG. With an expiration of one chip select cycle TCS2 at time T2, /SCS is toggled and with an expiration of time period TIDEX from time T2, the ID generation ends at time T3. The time period TIDEX between times T2 and T3 is pre-defined by any number of clock cycles depending upon the system (e.g., five clock cycles or five rising edges of the clock pulse after time T2).

Referring to FIGS. 4A-4D, the serial input SI contains ID and "write ID entry". For a signal transfer between the OPE and the OPEQ or op1 and op2, in a non-overlap section of time of more than two cycles should occur to avoid an operation contention caused by an ID increment and data transferring to an adjacent and next device. After the OPE is asserted at each of device 310-1-310-N, latched ID input data is stored in an ID register (e.g., the serial-to-parallel register 351 in FIG. 4C) of the device and an increment operation with this input is performed before asserting the OPEQ (e.g., by the ID calculator 353 shown in FIG. 4C). A function of the signal at the OPE is to determine the number of ID bits from 1 bit to the maximum number of defined bits of the ID register into each memory device. Because of this function, the signal corresponding to device ID should be transferred to the next device in order beginning with the least significant bit (LSB) and ending with the most significant bit (MSB). The IDs are shown in Table 1.

TABLE 1

| ID Number | ID Binary Code (LSB → MSB) |
| --- | --- |
| ID0 (Initial ID) | 0000 |
| ID1 | 1000 |
| ID2 | 0100 |
| ID3 | 1100 |
| — | — |
| — | — |
| ID(N-2) | 01111 |
| ID(N-1) | 11111 |

In this example, N is 32. In other embodiments, N can be any other integer.

The ID stored in the ID register is according to the sequence and ID number itself. For example, if the ID register is 10-bits in length and OPE has a 5-cycle "high" state, then five bits are included in the ID generation and a signal corresponding to the 5-bit result is transferred to the next device. The remaining bits are ignored and "zero" values are kept in the ID registers. In the example shown in FIG. 4A, each of the devices 310-1-310-N is not categorized per device type and memories.

The ID generator 333 generates a sequence of device ID numbers with consecutive integers from low to high. The resulting device ID assignment is shown in Table 2.

TABLE 2

| Device | Assigned ID Number | ID Code |
| --- | --- | --- |
| 310-1 | ID0 | 00000 |
| 310-2 | ID1 | 10000 |
| 310-3 | ID2 | 01000 |
| — | — | — |
| — | — | — |
| 310-(N-1) | ID(N-2) | 01111 |
| 310-N | ID(N-1) | 11111 |

Alternatively, the sequence of device ID numbers could be any other numeral sequence, provided that the adder 333 is replaced with an alternative operator that enables the sequence. For example, the ID calculator 353 could be replaced with a subtractor for performing "−1 operation" of device ID, thereby enabling a sequence of consecutive integers from high to low.

Figure 5A:
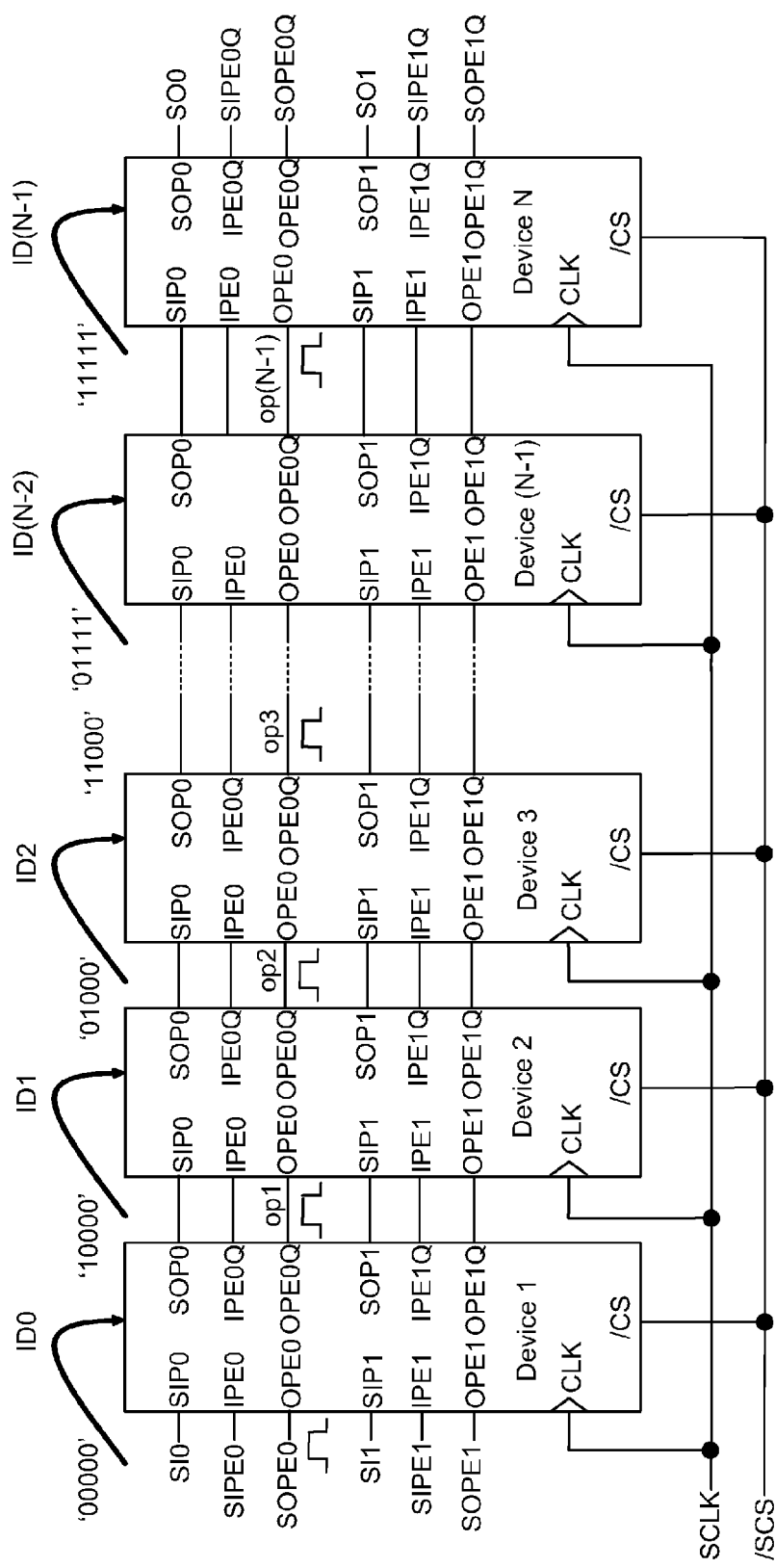
FIG. 5A is a block diagram illustrating a plurality of devices in a serial interconnection operating to establish an ID in a dual link.
Figure 5B:
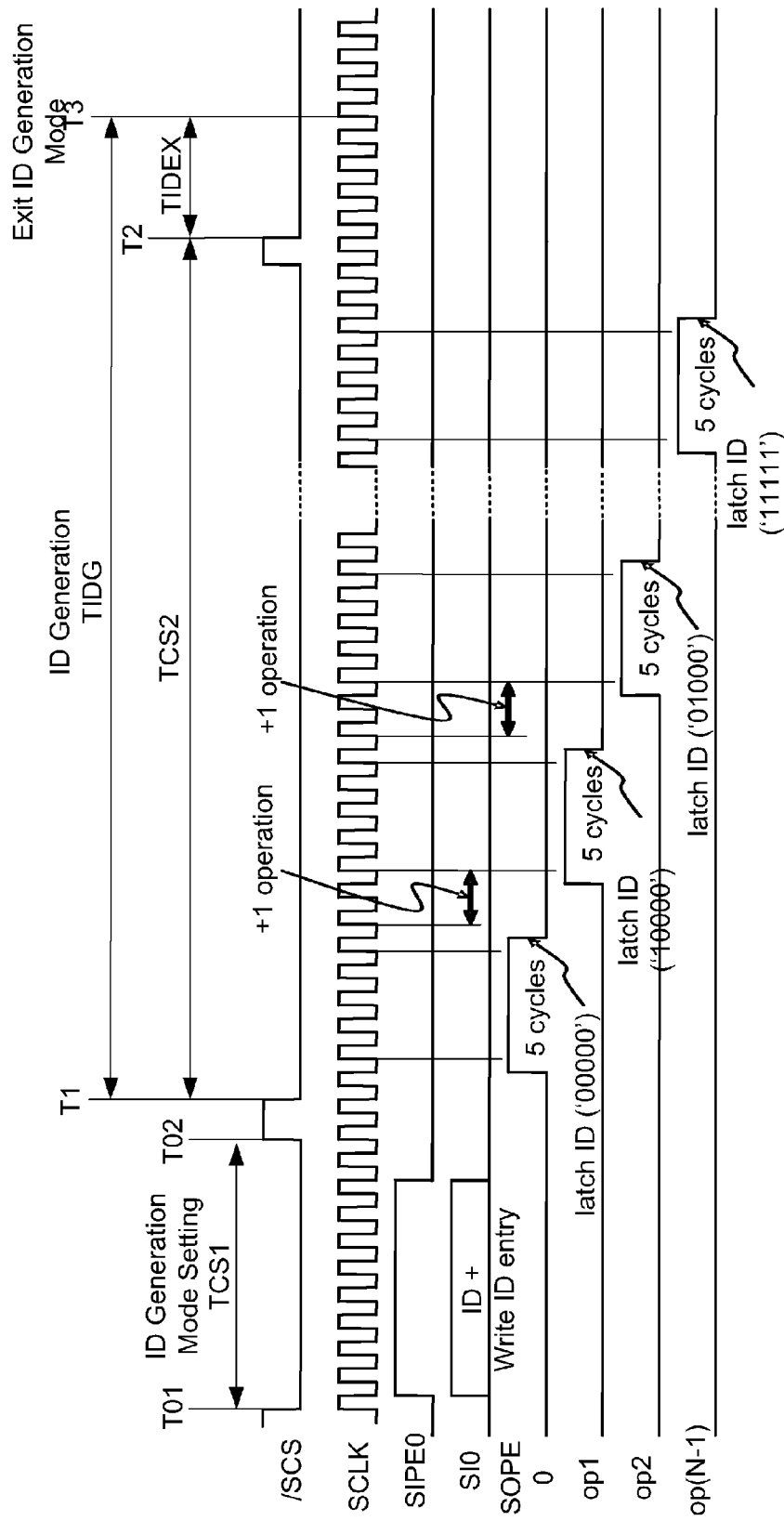
FIG. 5B is a timing diagram of signals transferred between the devices shown in FIG. 5A to establish each ID.

FIG. 5A shows a plurality of devices in a serial interconnection configuration operating to establish an ID at each device employing an example of ID generation logic for dual link. FIG. 5B shows a timing diagram of signals transferred between the devices shown in FIG. 5A to establish IDs. The connection of the devices' memories is different from that of FIG. 4A. FIG. 5A shows an example to describe how to generate IDs with dual links of a MISL device of a serial interconnection arrangement. Any serial input pin and one control pin can have the same functionality as depicted in FIG. 5A.

Figure 6A:
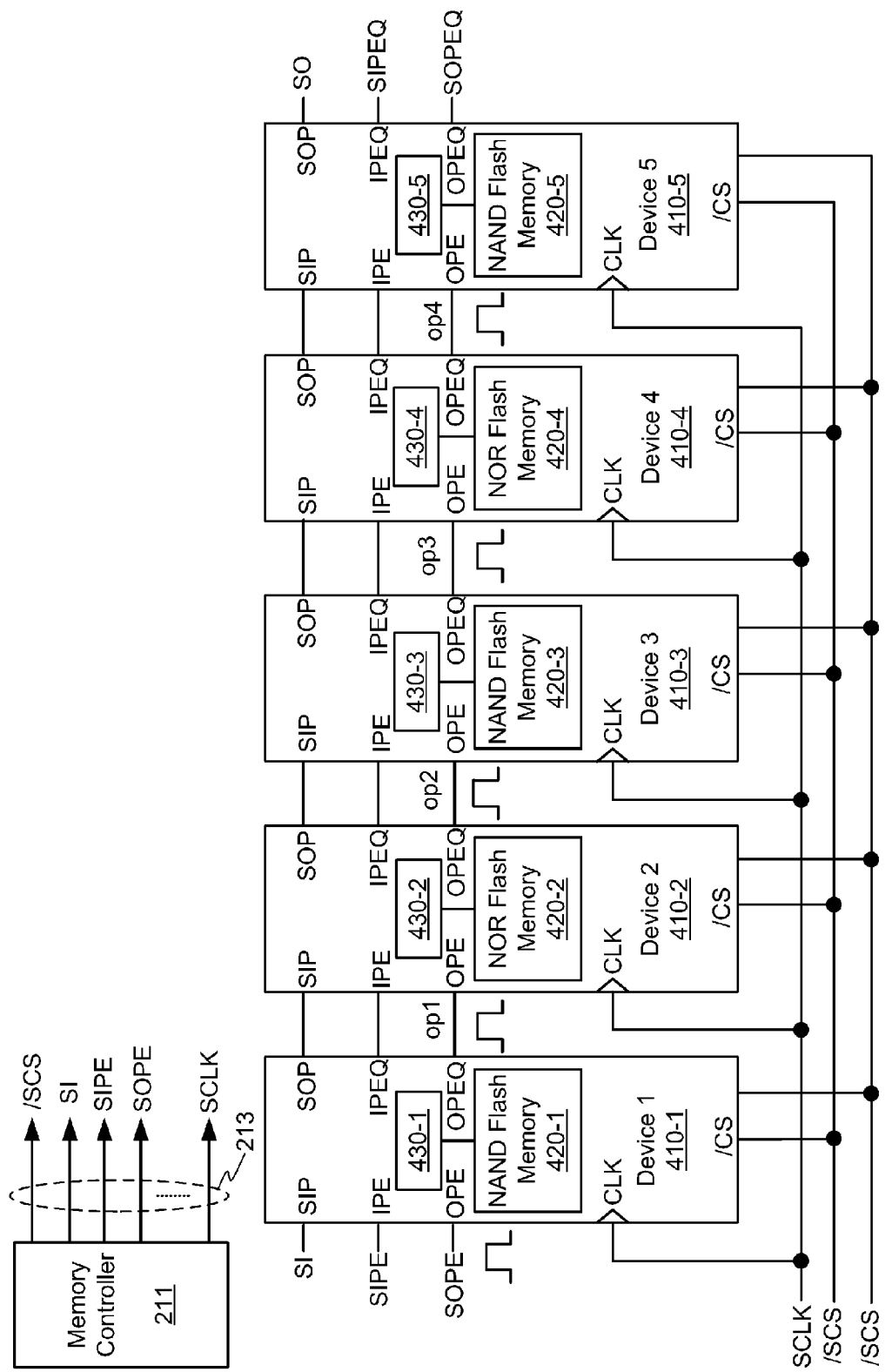
FIG. 6A is a block diagram illustrating a plurality of devices of mixed type in a serial interconnection, in which embodiments of the present invention are implemented.

FIG. 6A shows a plurality of memory devices of mixed type configured in a serial interconnection arrangement. In the example shown in FIG. 6A, devices 1-5 (410-1-410-5) are interconnected and they include memories 420-1-420-5 therein. Each of memories 420-1, 420-3 and 420-5 has a NAND Flash memory. Each of memories 420-2 and 420-4 has a NOR Flash memory. For example, a system implementing such an arrangement of different types or a mixed-device serial interconnection may require that only devices of a certain type (e.g., NAND Flash devices) be assigned IDs. Alternatively, the system may require that all devices be assigned IDs, but that all devices of the same type are assigned IDs in a consecutive sequence. In order to meet such requirements in a system implementing ID generation as described above, five devices 410-1-410-5 are provided with device controllers 430-1-430-5, respectively. One of the functions performed by the device controller is to assign a device ID based on the device type. A memory controller 211 provides a group of signals 213 containing a chip select /SCS, a serial input SI, an input port enable SIPE, an output port enable SOPE, a clock SCLK, and other control and data information (not shown) that are provided to the devices.

Figure 6B:
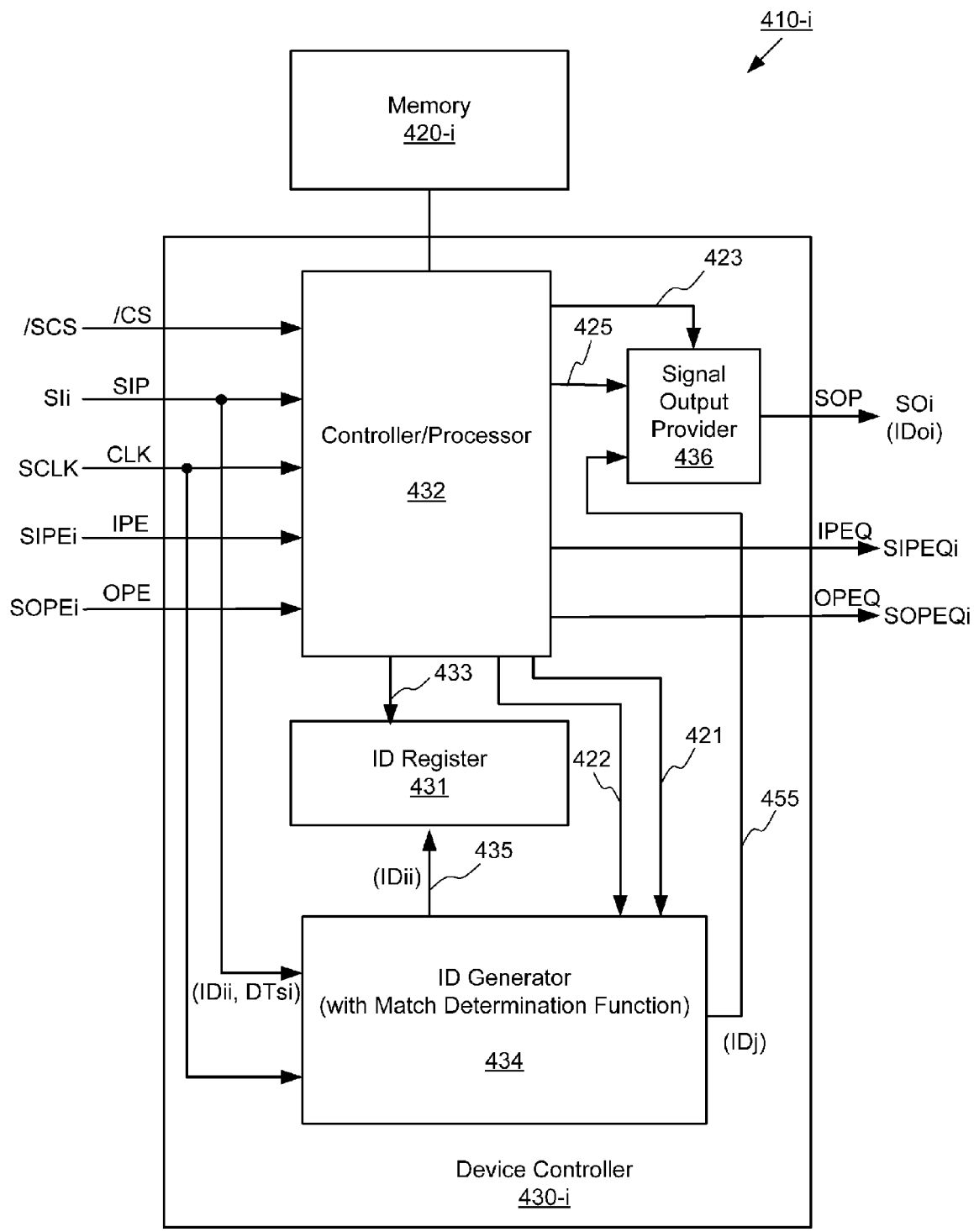
FIG. 6B is a block diagram illustrating one of the devices shown in FIG. 6A.
Figure 6C:
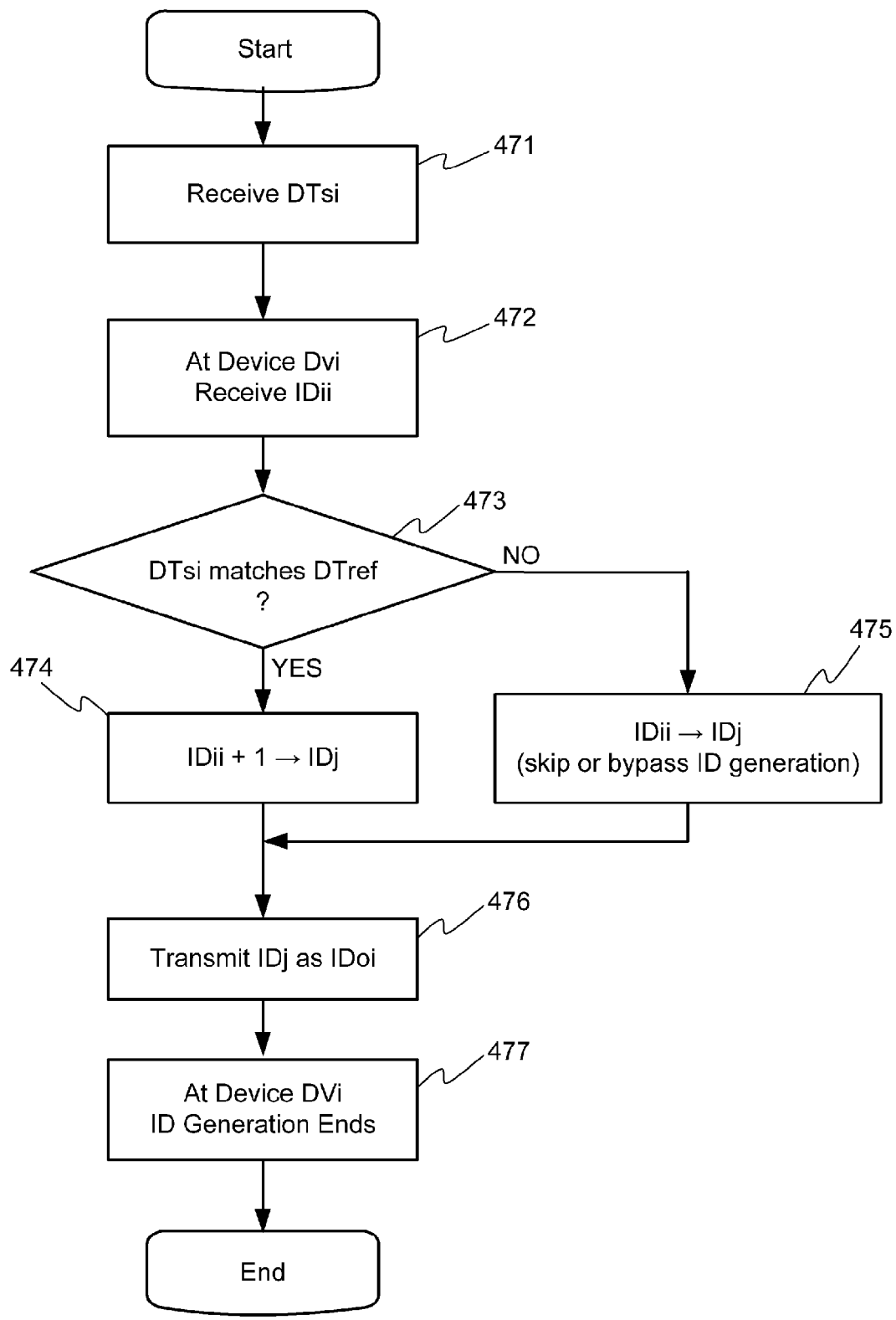
FIG. 6C is a flow chart of an ID generation method performed by a device controller shown in FIG. 6B.

FIG. 6B shows a device 410-i which represents the devices 410-1-410-5. The device 410-i includes the memory 420-i and the device controller 430-i connected thereto. The device controller 430-i includes a controller/processor 432, an ID generator 434, an ID register 431 and an output signal provider 436. The serial input SIi to the SIP of the device 410-i contains the command, device identifier IDii and other signal data. The controller/processor 432 receives the SIi, the SIPEi, the SOPEi and performs control and data processing functions. The controller/processor 432 provides an ID generation control signal 421 to the ID generator 434 that determines whether a received device type matches a pre-defined device type. The received device type, DTsi, is a device type (DT) received through the serial input SI. The pre-defined device type is a reference DT, DTref, fed by storage means (not shown). The ID generator 434 produces an ID, IDj, based on the received ID, IDii, to establish an ID for another device, in response to the determination result. The established IDj contained in a serial output ID signal 455 from the ID generator 434 is transmitted through the output signal provider 436, in response to an ID generation enable signal 423. The ID generation ends in response to an ID generation mode exit signal 422 provided by the controller/processor 432. An ID production method performed by the device is shown in FIG. 6C. When the ID generation is not performed (e.g., a normal mode operation), data processed by the controller/processor 432 and contained in a processed data signal 425 is transmitted through the output signal provider 436.

The controller/processor 432 also provides an ID write enable signal 433 derived from the output port enable signal SOPE. In response to the ID write enable signal 433 and the determination result from the ID generator 434, the ID register 431 registers the received IDii contained in an ID signal 435 from the ID generator 434, as an ID for the present device 410-i. The registered ID is held until powered-off. The ID registration by the ID register 431 occurs only when the received DT, DTsi, matches the reference DT, DTref. In the case of no matching between DTsi and DTref, no ID registration occurs and the ID register 431 holds a reset value (e.g., "zero" state).

Referring to FIGS. 6B and 6C, the devices receives device type DTsi (step 471). Thereafter, the ID generator 434 of device 410-i, DVi, receives IDii from the previous device, DV(i−1). Also, the device, DVi, receives information on the device type DTsi (step 472). Then, the received DTsi is compared to a reference device type DTref provided by storage means (hereinafter described) (step 473). If the DTsi matches the DTref, the IDii will be incremented to produce a new IDj (step 474). If there is no match at step 472, the IDii will be maintained as a new IDj (step 475). Thus, at step 475, the ID generation is skipped or bypassed. After step 474 or 475, the new IDj is fed by the ID generator 434 to the output signal provider 436 which in turn provides the new IDj as an output ID, IDoi, to the next device (DV(i+1)) (step 476) and the ID generation is completed at the device DVi (step 477).

Figure 6D:
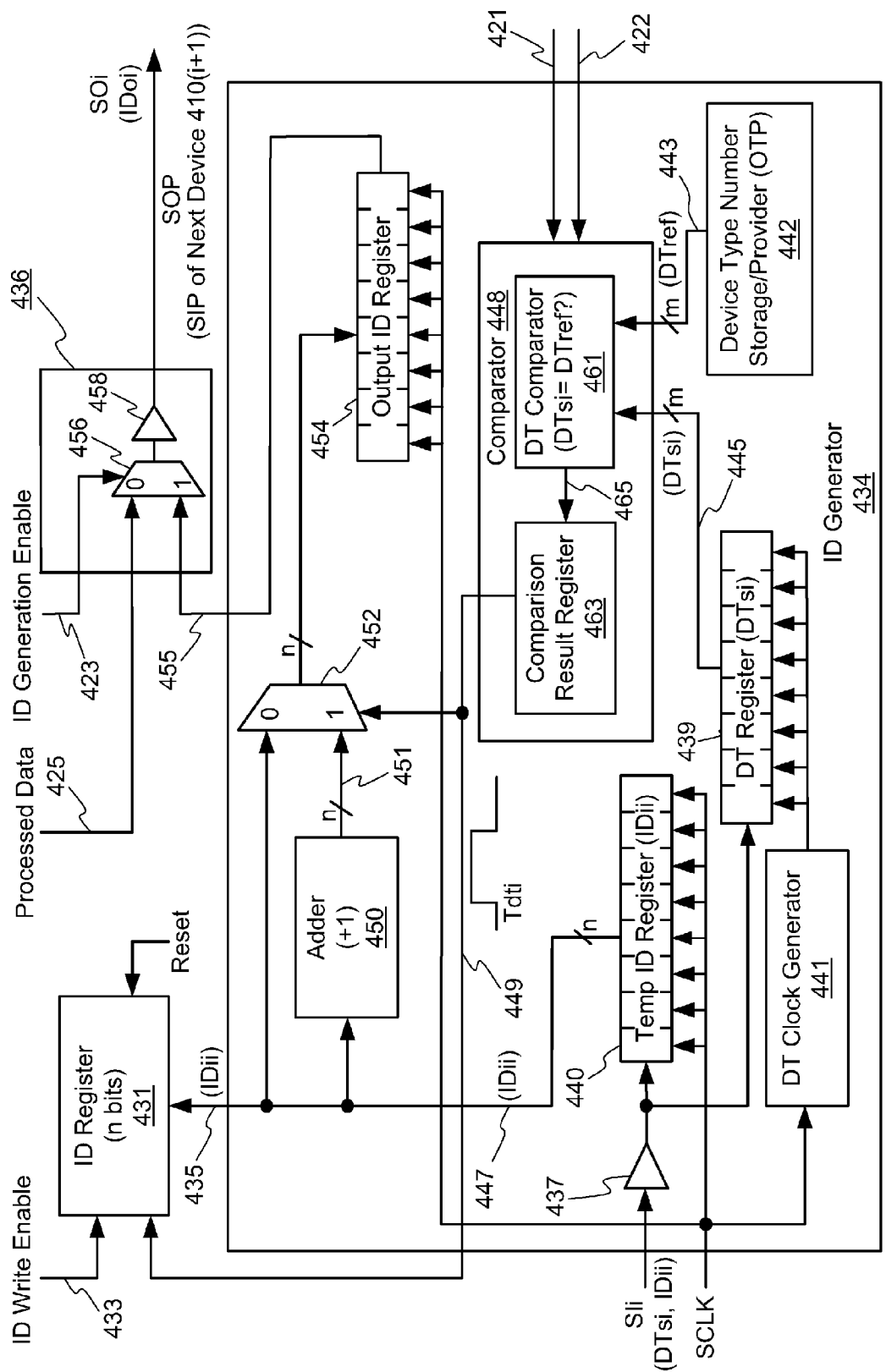
FIG. 6D is a block diagram illustrating an example of the ID generator shown in FIG. 6B.

FIG. 6D shows details of the ID generator 434 and the output signal provider 436 shown in FIG. 6B. Referring to FIGS. 6A-6D, the ID generator 434 includes a device type number storage/provider 442 of a one-time-programmable (OTP) element configured by a non-volatile memory. The OTP element stores a device type number as a device type reference (DTref) that is programmed to the device prior to ID generation. Table 3 shows an example of device type number assignment and the definition of device types in serialized byte code.

TABLE 3

| Device Type | HEX | Bit 7 | Bit 6 | Bit 5 | Bit 4 | Bit 3 | Bit 2 | Bit 1 | Bit 0 |
|---|---|---|---|---|---|---|---|---|---|
| NAND Flash (DTnd) | 00h | 0 | 0 | 0 | 0 | 0 | 0 | 0 | 0 |
| NOR Flash (DTnr) | 01h | 0 | 0 | 0 | 0 | 0 | 0 | 0 | 1 |
| DRAM (DTrm) | 02h | 0 | 0 | 0 | 0 | 0 | 0 | 1 | 0 |
| SRAM (DTsm) | 03h | 0 | 0 | 0 | 0 | 0 | 0 | 1 | 1 |
| — | — | — | — | — | — | — | — | — | — |
| — | — | — | — | — | — | — | — | — | — |
| — | — | — | — | — | — | — | — | — | — |
| MRAM (DTmm) | FFh | 1 | 1 | 1 | 1 | 1 | 1 | 1 | 1 |

The device type number assignment and the definition of device types in Table 3 above can be changed. More device types can be added.

The ID generator 434 also includes a serial input buffer 437 for receiving the serial input SIi through SIP of the device. The received SIi in the ID generation mode setting operation includes a value corresponding to a device type (DT), DTsi, which is a number of m-bits (e.g., eight bits). The received SIi in the ID generation operation includes a value corresponding to a device ID, IDii, which is a number of n-bits (e.g., eight bits). The clock signal SCLK is fed to a temporary ID register 440 and a device type (DT) clock generator 441. A DT register clock signal is internally generated in response to the clock signal SCLK. Each of the temporary ID register 440 and the DT register 439 is a serial-to-parallel register that registers the input serial data therein in response to the input clocks. In the ID generation mode setting operation, the m-bit DTsi contained in the SI is serially shifted into the register 439 in response to the DT register clock signal and held therein. In the ID generation mode, the n-bit IDii contained in the SI is serially shifted into the register 440 in response to the clock signal SCLK and held therein.

The m-bit DTsi and n-bit IDii separately held in the registers 439 and 440 are outputted in parallel as m-bit signal 445 and n-bit signal 447, respectively. The n-bit signal 447 is fed to a selector 452 and an adder 450 that provides a calculation signal 451 having a +1 operation value. The m-bit signal 445 is fed to a comparator 448 that also receives m-bit DT number, DTref, contained in a DT signal 443 from the DT number storage/provider 442. The comparator 448 includes an m-bit DT comparator 461 and a comparison result register 463. In response to the ID generation control signal 421 at determination time Tdti, the DT comparator 461 compares the DTsi to the DTref to provide a comparison result signal 465 to the comparison result register 463. Thus, the DT match determination result is held in the comparison result register 463 that provides a DT match signal 449. If DTsi and DTref are identical, the DT match signal 449 will become "high," indicating a match between the two numbers of the device types DTsi, and DTref. Otherwise, the DT match signal 449 will become "low," indicating that the received DTsi specifies a type of device that is different from that of the present device (410-i). The comparator 448 outputs the "high" DT match signal having a pulse width Tm, when a device type match occurs. Storing time period Tm is selected as the +1 operation is completed and the addition result is transferred to the parallel-to-serial register 454. The DT match signal 449 transits to "low" in response to the ID generation mode exit signal 422 from the controller/processor 432. Thus, Tm ends as the ID generation mode exits.

The adder 450 adds "1" to IDii, thereby producing the calculation signal 451 containing an ID, IDii+1, for another device (e.g., a next device) in a sequence of IDs in the serial interconnection. The adder 450 provides an appropriate function for ID generation when the selected sequence of ID numbers are consecutive integers from low to high. Alternatively, the sequence of ID numbers could be any other numeral sequence, provided that the adder 450 is replaced with an alternative operator that enables the sequence. For example, the adder 450 could be replaced with a subtractor that subtracts "1" from the ID, IDii, thereby enabling a sequence of consecutive integers from high to low.

The selector 452 selects one of the two inputs (effectively "added ID, IDii+1" and "non-added ID, IDii") according to the DT match signal 449. If the DT match signal 449 is "high" (corresponding to a match between the DTsi and the DTref), then the selector 452 selects input "1", which receives the signal 451 of "added IDii +1" from the adder 450. If the DT match signal 449 is "low" (corresponding to a difference between the DTsi and the DTref), then the selector 452 selects input "0", which receives the signal 447 of "non-added IDii" from the serial-to-parallel register 440. The selected output signal of n-bits is fed to a parallel-to-serial register 454 that is enabled to register the selected n-bit ID data therein immediately before the expiration of the time period Tm, in response to an enable signal (not shown). The parallel-to-serial register 454 outputs the registered data in a serial manner as the serial output ID signal 455, in response to the clock signal SCLK. The serial output ID signal 455 is fed to a selector 456 of the output signal provider 436. The selector 456 also receives the processed data signal 425 provided by the controller/processor 432 accessing the memory 420-i (NAND or NOR Flash memory) of that device 410-i. In response to the ID generation enable signal 423 derived from the generation command by the controller/processor, the selector 456 selects the serial output ID signal 455 or the processed data signal 425 when the ID generation enable signal 423 is "high" (an ID generation mode) and "low" (the normal mode), respectively. A selected signal from the selector 456 is outputted through a serial output buffer 458 to the next device (410-(i+1)) in the serial interconnection.

It is noted that the aforementioned selector 452 is shown for selecting a single bit of IDii or a single bit of IDii+1. Accordingly, there are n duplicate selectors to select the n-bit signal 451 or 447 and output the selected n-bit signal, in response to the DT match signal 449.

The ID generator 434 provides the ID signal 435 containing the n-bit ID, IDii, to the ID register 431. In response to the ID write enable signal 433 from the device controller 430-i, the ID register 431 registers or latches the received ID, IDii, for the present device 410-i. The registered ID is held until powered-off. The ID register 431 is initially reset to the zero state and thus, if no ID latch occurs, the ID register 431 will hold the zero state.

With reference to FIG. 6A, for example, the above described ID generation process is completed by device 1's controller 430-1 at device 410-1 that is a NAND Flash memory device. The device controller 430-1 outputs the resulting device ID to device 2, 410-2, that is a NOR Flash memory device. Device 2's controller 430-2, located at device 410-2, performs the same operation as device 1's controller 430-1, transferring the resulting device ID to device 410-3. This process is repeated for all devices 410-1-410-5 in the serial interconnection, until the device ID has passed through all devices.

Figure 7A:
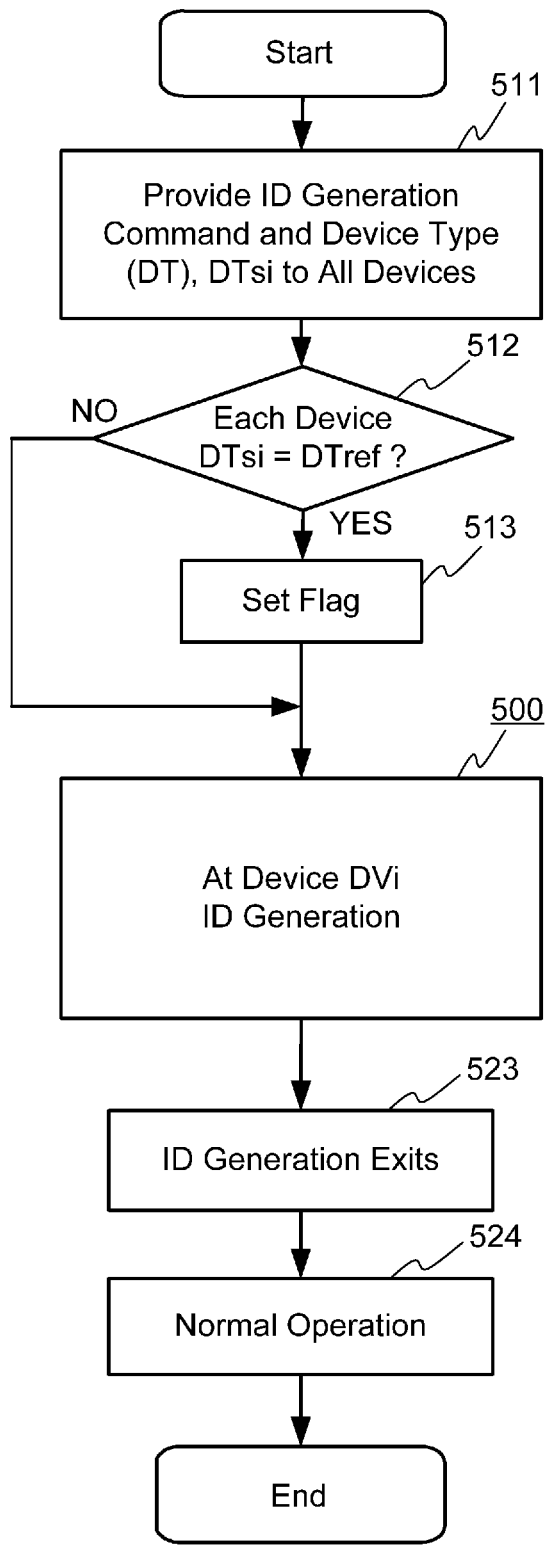
FIG. 7A is a flow chart of an ID generation method with a skip or bypass function.
Figure 7B:
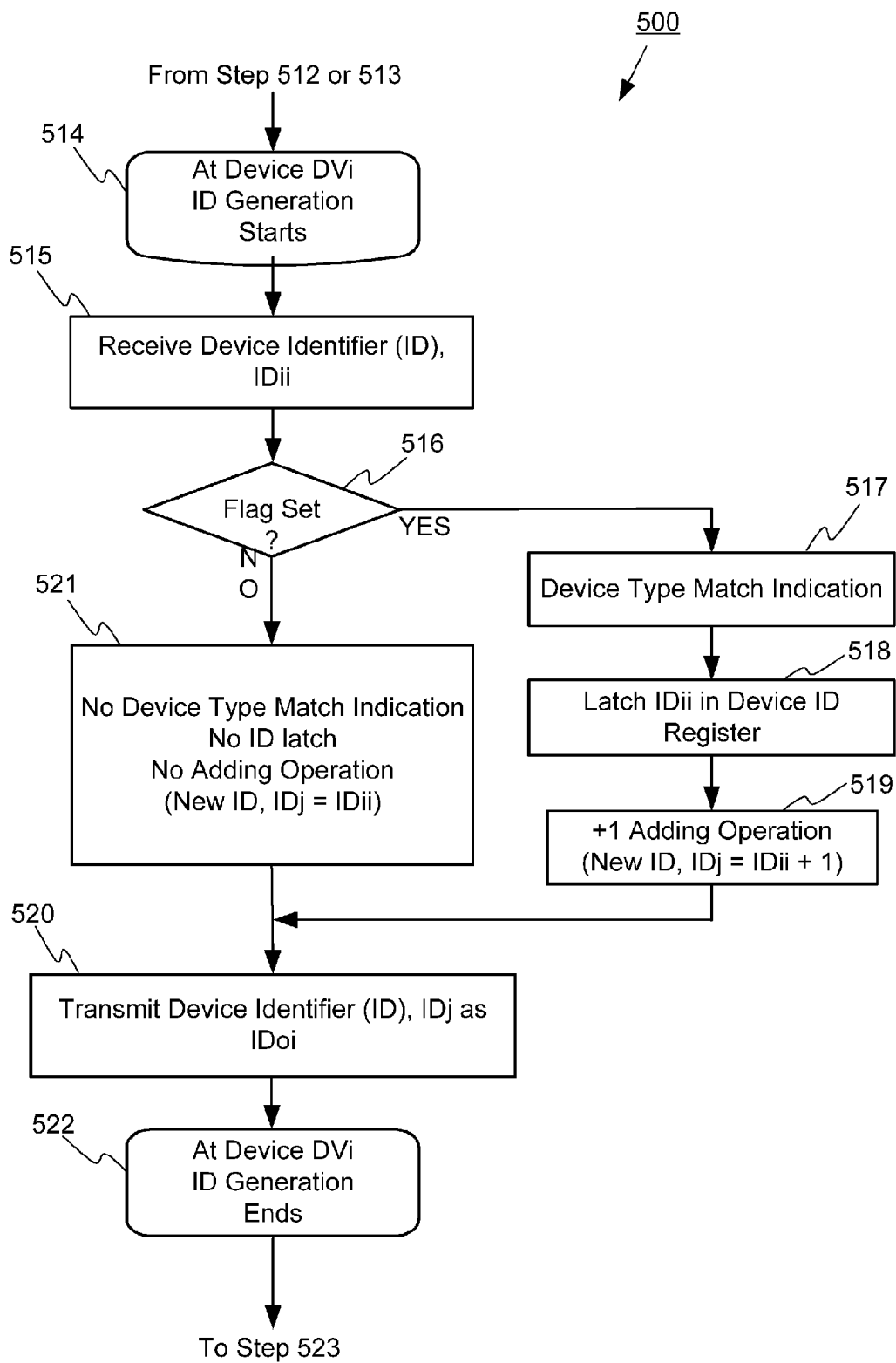
FIG. 7B is a flow chart illustrating part of the ID generation shown in FIG. 7A.

FIG. 7A shows a more detailed process for device ID generation with an additional function of skip or bypass. FIG. 7B shows part (step 500) of the ID generation method shown in FIG. 7A. Referring to FIGS. 6D, 7A and 7B, before the ID generation process, the ID generation command and a device type DT, DTsi, are provided by the memory controller 211 (see FIG. 6A) to all devices in the serial interconnection, so that all devices are ready for ID generation (step 511). In step 511, at each device, the DT clock generator 441 of the ID generator 434 generates the DT register clocks in response to the clock signal SCLK and the received DTsi is shifted into the DT register 439. Thus, the device type DTsi is held in the DT registers 439 of all devices. At each of the devices, the DT comparator 461 of the comparator 448 compares the held DTsi to the reference DT, DTref, corresponding to the device type (step 512) and if the values or numbers match between the DTsi and the DTref, a flag will be set (step 513). If no matches between the DTsi and the DTref, no flag will be set. The flag set at step 513 is performed by registering a one-bit comparison result of the signal 465 in the comparison result register 463. Thereafter, the i-th device DVi starts the ID generation process (step 514). The device DVi (e.g., device 2) receives, from the previous device DV(i−1) (e.g., device 1), a device ID, IDii, and the received ID is held in the temporary ID register 440 (step 515). Then, it is determined whether the flag is set or not (step 516). If the flag is set (at step 513), i.e., a match between the DTsi and the DTref, the DT match signal 449 will be "high" (step 517). This signal indicates to the device to store or latch the received device ID, IDii (step 518), thereby assigning or establishing the device ID for the present device, DVi. These operations are performed during the ID generation mode setting process. This will be later described with reference to FIG. 8B.

After step 518, the ID number or value is then altered by a "+1" operation (step 519), resulting in a new device ID, IDj. The new device ID, IDj, is converted to a serial signal (step 520) for transmission to the next device DV(i+1) (e.g., device 3) in the serial interconnection. As a result, the next device DV(i+1) receives the ID number, IDii. As the device DV(i+1) already received and held the device type DTsi in its DT register, the same ID generation process starts.

If the values of the DTsi and the DTref do not match (a negative determination at step 512), then no flag is set and no DT determination result is registered, so that the DT match signal 449 is "low". This signal indicates to the device not to store the received device ID number, IDii, with no adding operation (step 521), and to transfer the device ID number to the next device in the serial interconnection (step 520). Upon completion of step 520, the ID generation process at the device DVi ends (step 522). The process shown in FIG. 7B can be repeated at each device in the serial interconnection performing operations of steps 514-522. After the ID generation process ends at all devices, the ID generation mode operation ends, as the ID generation mode exit signal 422 is fed to the ID generator 434 (step 523). Thereafter, the system performs the function of data process in the normal mode (step 524).

Alternatively, steps 518 and 519 can be reversed, wherein the "new" device ID number (resulting from the "+1" operation) is stored at a device register. As a result, the device ID established for the device is the resulting "new" device ID number instead of the received device ID number. Accordingly, a memory controller may be configured to address the memory devices in the serial interconnection according to the device IDs established at each device.

When each device in the serial interconnection has completed the process, all devices with a matching DT number have established a device ID (step 518), and all other devices have refrained from establishing a device ID (step 521). To establish device IDs for these other devices, the process can be repeated for all devices, wherein the device type DTsi is replaced with a value matching the device type number of some or all of the other devices. For example, a first process, with DTsind matching a NAND Flash device, could be completed at all devices, thereby establishing a device ID at each NAND Flash device in the serial interconnection. Afterwards, a second process, with DTsinr matching a NOR Flash device, could be completed at all devices, thereby establishing a device ID at each NOR Flash device in the serial interconnection. The process may be further repeated for other device types (e.g., DRAM, SRAM) in the serial interconnection. As a result, each device in the serial interconnection can be uniquely identified in subsequent commands by specifying the device ID and device type DT of that device.

In a case where the stored reference device type DTref of the DT number storage/provider 442 is chosen for the NAND Flash memory, the device type DT is "00h" (see Table 3 above). In the process shown in FIGS. 7A and 7B, (at step 516), devices 1, 3 and 5 (410-1, 410-3 and 410-5) determine that the DTsi "match" the stored DTref and thus, at step 519, the +1 operation is performed for generating the next ID. In devices 2 and 4 (410-2 and 410-4) that are NOR Flash memories, the DT ("01h") do not match the chosen stored DT (the negative determination at step 516) and thus, no +1 operation is performed (step 521). At "non-match" devices, no ID registration (i.e., no ID latch) is performed and thus, the reset "zero state" is maintained in the ID registers. The resulting latched IDs and generated IDs are shown in Table 4.

TABLE 4

| Device | Device Type | DT Number or Value | Latched or Registered ID | Generated or Bypassed ID |
| --- | --- | --- | --- | --- |
| 410-1 | NAND Flash | 00 h | 000 | 100 |
| 410-2 | NOR Flash | 01 h | 000 | 100 |
| 410-3 | NAND Flash | 00 h | 100 | 010 |
| 410-4 | NOR Flash | 01 h | 000 | 010 |
| 410-5 | NAND Flash | 00 h | 010 | 110 |

In a case where the stored DT of the DT number storage/provider 442 is chosen for the NOR Flash memory, the DT is "01h" (see Table 3 above). In the process shown in FIGS. 7A and 7B, (at step 516), devices 2 and 4 (410-2 and 410-4) determine that the DTsi "match" the stored DTref and thus, the +1 operation (step 519) is performed for generating the next ID. In devices 1, 3 and 5 (410-1, 410-3 and 410-5) that are NAND Flash memories, the DTsi ("00h") does not match the chosen stored DTref (the negative determination at step 516) and thus, no +1 operation is performed (step 521). The resulting latched IDs and generated IDs are shown in Table 4.

Resulting device ID/device type assignment is shown in Table 5.

TABLE 5

| Device | Device Type | DT Number or Value | Latched or Registered ID | Generated or Bypassed ID |
|---|---|---|---|---|
| 410-1 | NAND Flash | 00 h | 000 | 000 |
| 410-2 | NOR Flash | 01 h | 000 | 100 |
| 410-3 | NAND Flash | 00 h | 000 | 100 |
| 410-4 | NOR Flash | 01 h | 100 | 010 |
| 410-5 | NAND Flash | 00 h | 000 | 010 |

Figure 8A:
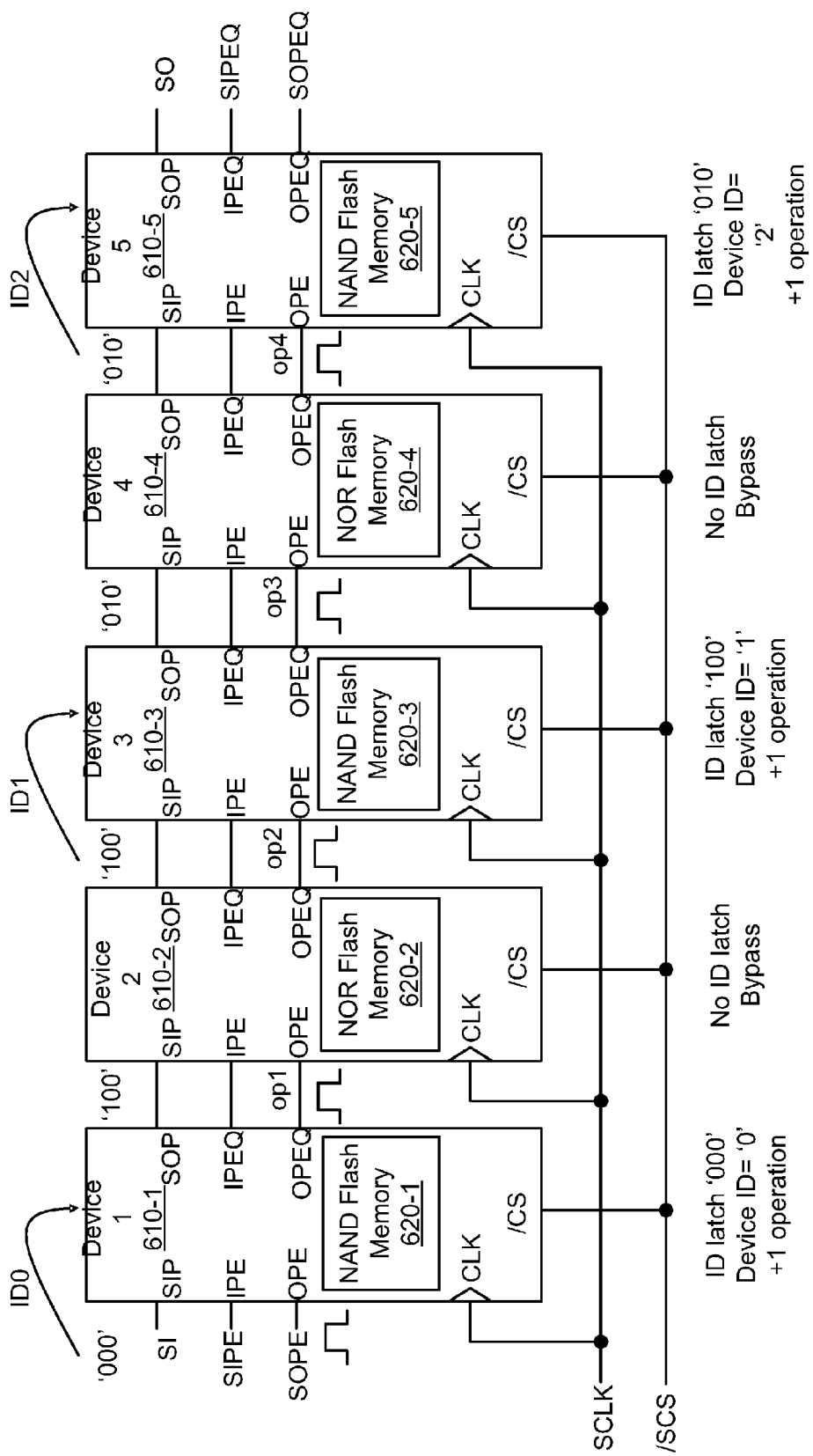
FIG. 8A is a block diagram illustrating a plurality of devices of mixed type in a serial interconnection, in which the ID generation of NAND memory devices is performed.
Figure 8B:
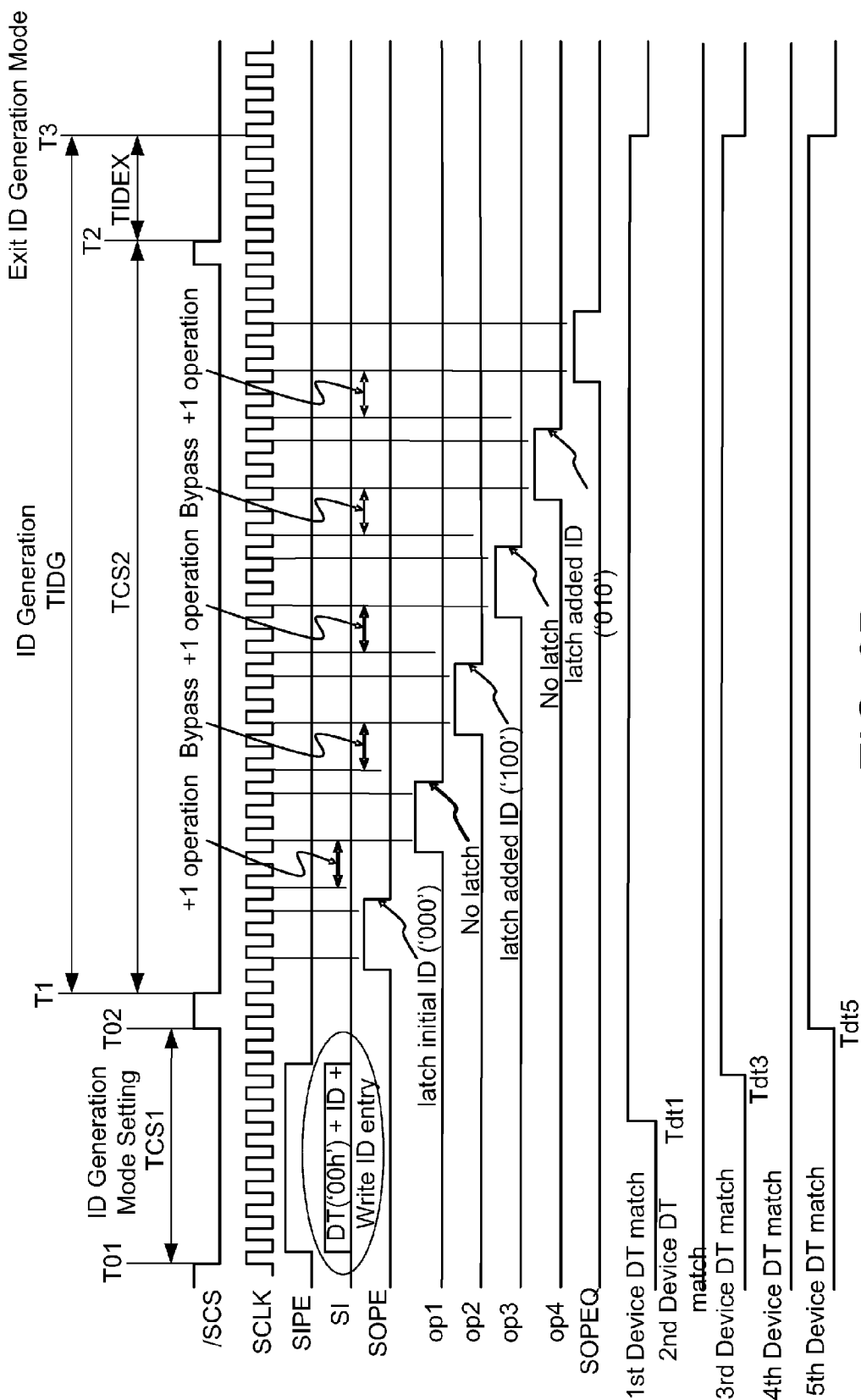
FIG. 8B is a timing diagram of the ID generation in the serial interconnection shown in FIG. 8A.

FIG. 8A shows the ID generation for NAND memory devices in a mixed-device serial interconnection. FIG. 8B shows signal timings for the ID generation of NAND memory devices shown in FIG. 8A. The configuration shown in FIG. 8A is similar to one shown in FIG. 6A.

Referring to FIGS. 8A and 8B, devices 1, 3 and 5 (610-1, 610-3 and 610-5) are memory devices including NAND Flash memories 620-1, 620-3 and 620-5, respectively. Devices 2 and 4 (610-2 and 610-4) are memory devices including NOR Flash memories 620-2 and 620-4, respectively. Each of five devices 610-1-610-5 includes a device controller (not shown) that is similar to the device controller 430-i shown in FIG. 6B, which provides a skip function of ID generation. Operation of the serially interconnected devices of FIG. 8A is the same as one of the cases where the stored DT of the DT number storage/provider 442 is chosen for the NAND Flash memory. The resulting device ID/device type assignment is shown in Table 4 above. The device type match signals (e.g., the DT match signal 449 shown in FIG. 6D) in devices 1, 3 and 5 (610-1, 610-3 and 610-5) (NAND Flash devices) become "high" at determination times Tdt1, Tdt3 and Tdt5, respectively, as shown in FIG. 8B. However, the DT match signals in devices 2 and 4 do not become "high".

The SI contains the device type DT (DTsi), the device identifier ID (initial ID ('000')) and a "write ID entry" command. In this example, the DT is DTnd for the NAND Flash memory and its DT number or code is '00h', as shown in Table 3. During the ID generation mode setting time period TCS1, by the "write ID entry" command, IPE catches input streams which consists of command bits, Device type bits, Device ID bits (initial '000'). Thereafter, during TCS2 timing period, OPE catches an input stream, which consists of the same cycles as a total number of ID bits, e.g., three cycles. The ID bits are established by the size of an internal ID register. After the completion of the processes during the ID generation mode setting time period TCS1, the ID generation operation starts at time T1 and ends with an expiration of time period TIDG. With an expiration of one chip select cycle TCS2, TIDEX (e.g., five cycles or five rising edges of the clock pulse) after T2 the ID generation operation period TIDG expires at time T3. Devices 1, 3 and 5 provides the "high" device type match signals at determination times Tdt1, Tdt3 and Tdt5, respectively. Devices 2 and 4 do not, however, provide "high" match signal. In response the "high" DT match signals 449 (see FIG. 6D), devices 1, 3 and 5 write or latch the IDs '000', '100' and '010' and generate new IDs with +1 operation.

Figure 9A:
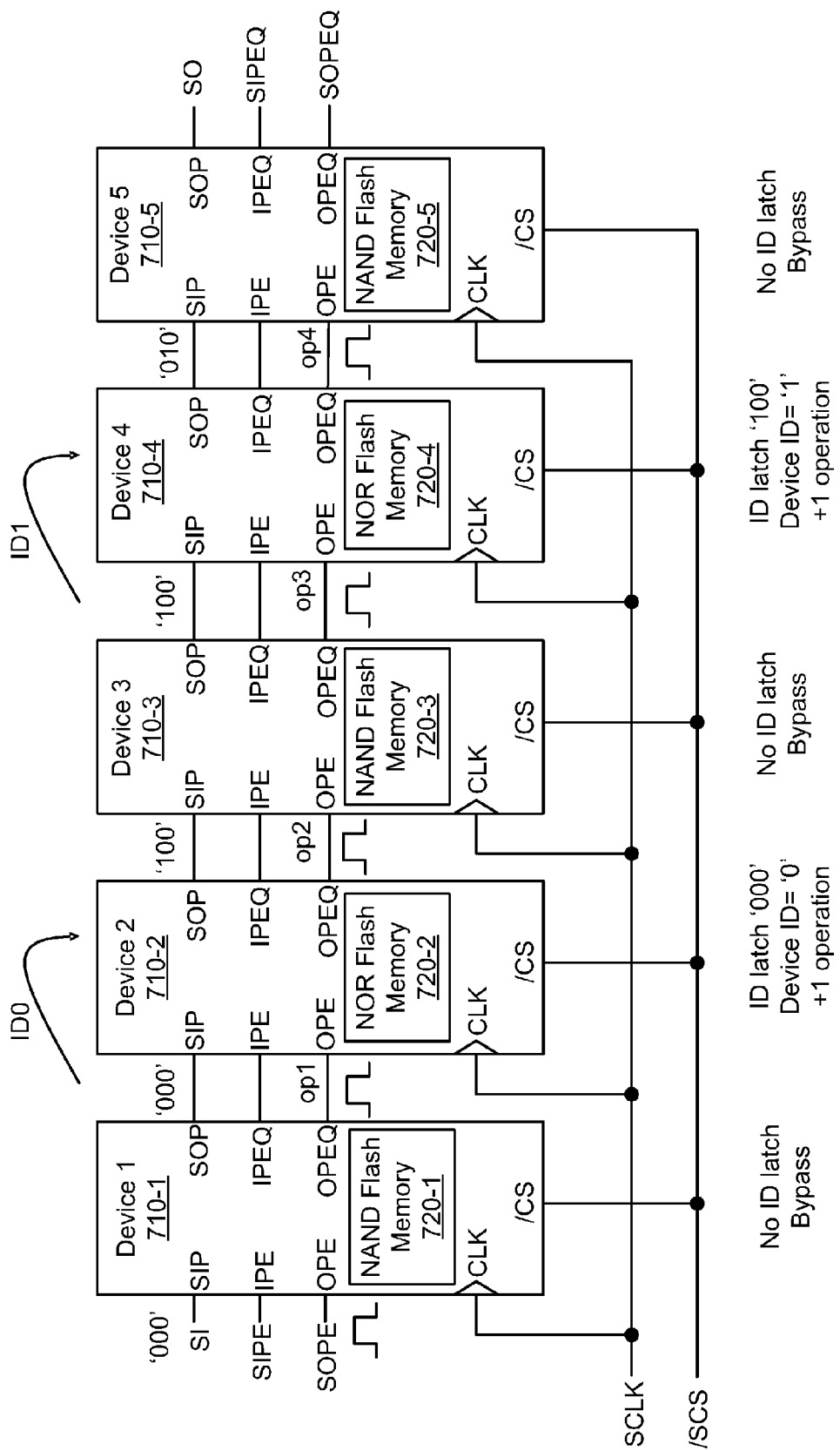
FIG. 9A is a block diagram illustrating a plurality of devices of mixed type in a serial interconnection, in which the ID generation of NOR memory devices is performed.
Figure 9B:
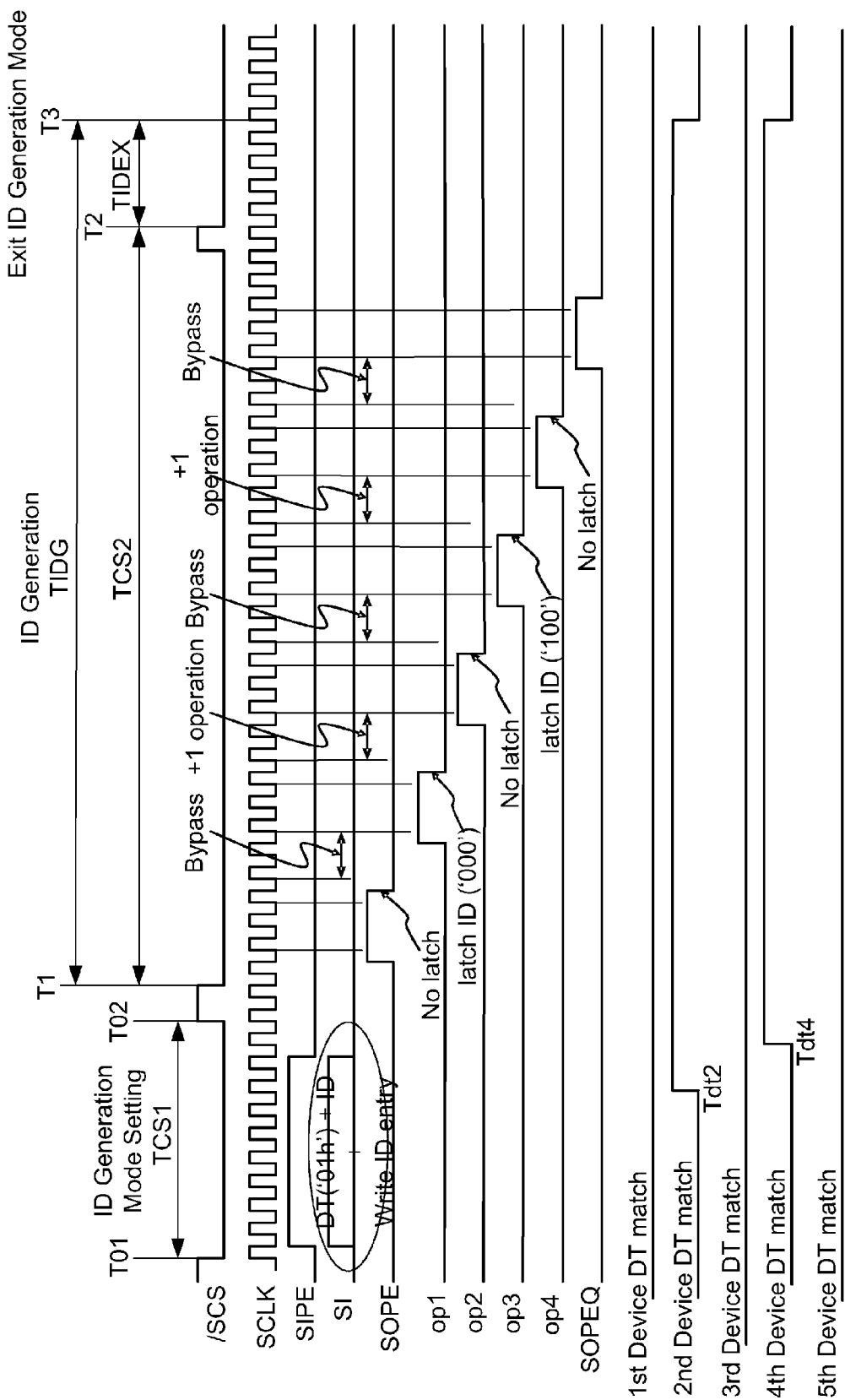
FIG. 9B is a timing diagram of the ID generation in the serial interconnection shown in FIG. 9A.

FIG. 9A shows the ID generation of NOR memory devices in a mixed-device serial interconnection. FIG. 9B shows signal timings for the ID generation of the NOR memory devices in the mixed-device serial interconnection shown in FIG. 9A. The configuration shown in FIG. 9A is similar to one shown in FIG. 8A.

Referring to FIGS. 9A and 9B, devices 1, 3 and 5 (710-1, 710-3 and 710-5) are memory devices including NAND Flash memories 720-1, 720-3, and 720-5. Devices 2 and 4 (710-2 and 710-4) are memory devices including NOR Flash memories 720-2 and 720-4. Each of five devices 710-1-710-5 includes a device controller (not shown) that is similar to the device controller 430-i shown in FIG. 6B that provides a skip function of ID generation. Operation of the serially interconnected devices of FIG. 9A is the same as the case where the stored DT of the DT number storage/provider 442 is chosen for the NOR Flash memory, DTnr, the number or code of which is '01h', as shown in Table 3. The resulting device ID/device type assignment is shown in Table 5 above. The device type match signals (e.g., the DT match signal 449 shown in FIG. 6D) in devices 2 and 4 (710-2 and 710-4) (NOR Flash devices) become "high" at determination times Tdt2 and Tdt4, respectively, as shown in FIG. 9B. In response to the "high" device type match signals, devices 2 and 4 latch the IDs '000' and '100' and generate new IDs with +1 operation. However, the DT match signals in devices 1, 3 and 5 do not become "high".

Figure 10:
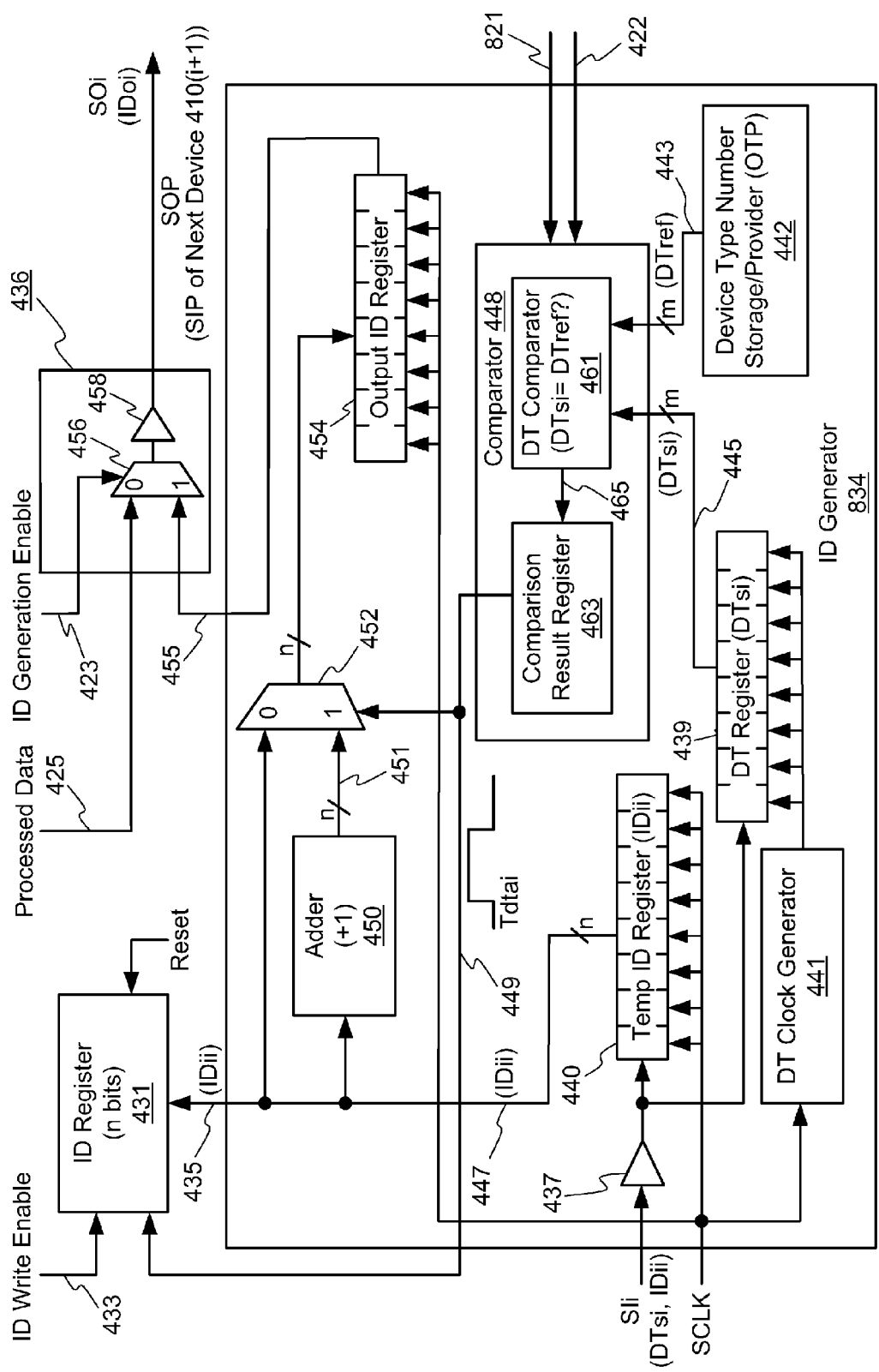
FIG. 10 is a block diagram illustrating another example of the ID generator.

FIG. 10 illustrates another example of the ID generator. The generator is similar to that of FIG. 6D. A difference is that an ID generation control signal 821, instead of the ID generation control signal 421, is fed to the comparator 448. The ID generation control signal 821 is fed in response to the output port enable signal OPE, so that the DT comparator 461 of the comparator 448 is activated at time Tdtai, after the OPE is enabled, to perform the device type comparison function.

Figure 12A:
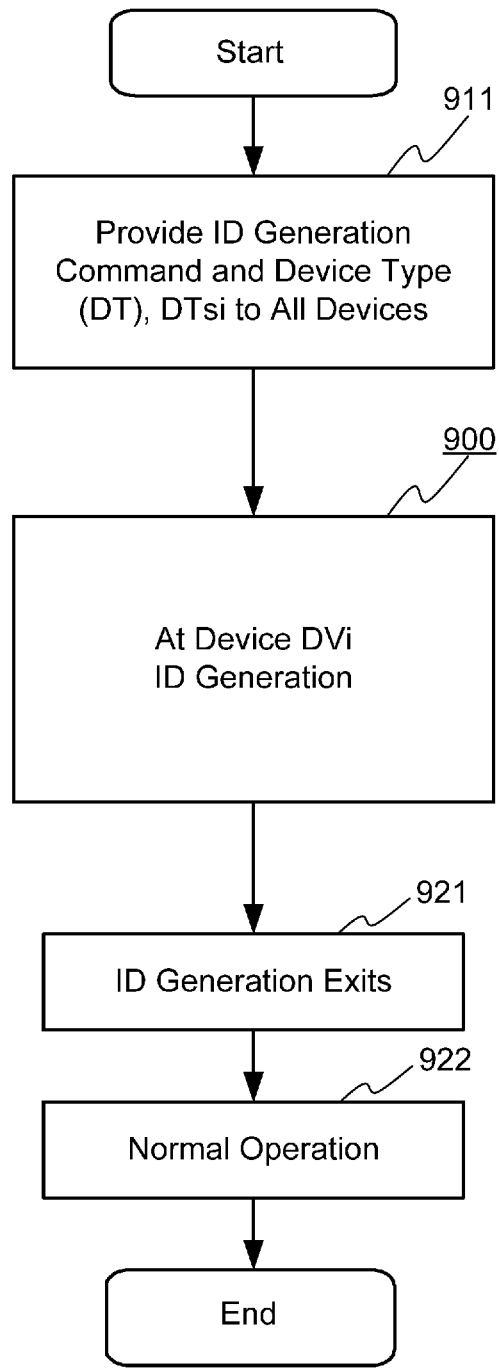
FIG. 12A is a flowchart illustrating an ID generation method performed by the ID generator shown in FIG. 10.
Figure 12B:
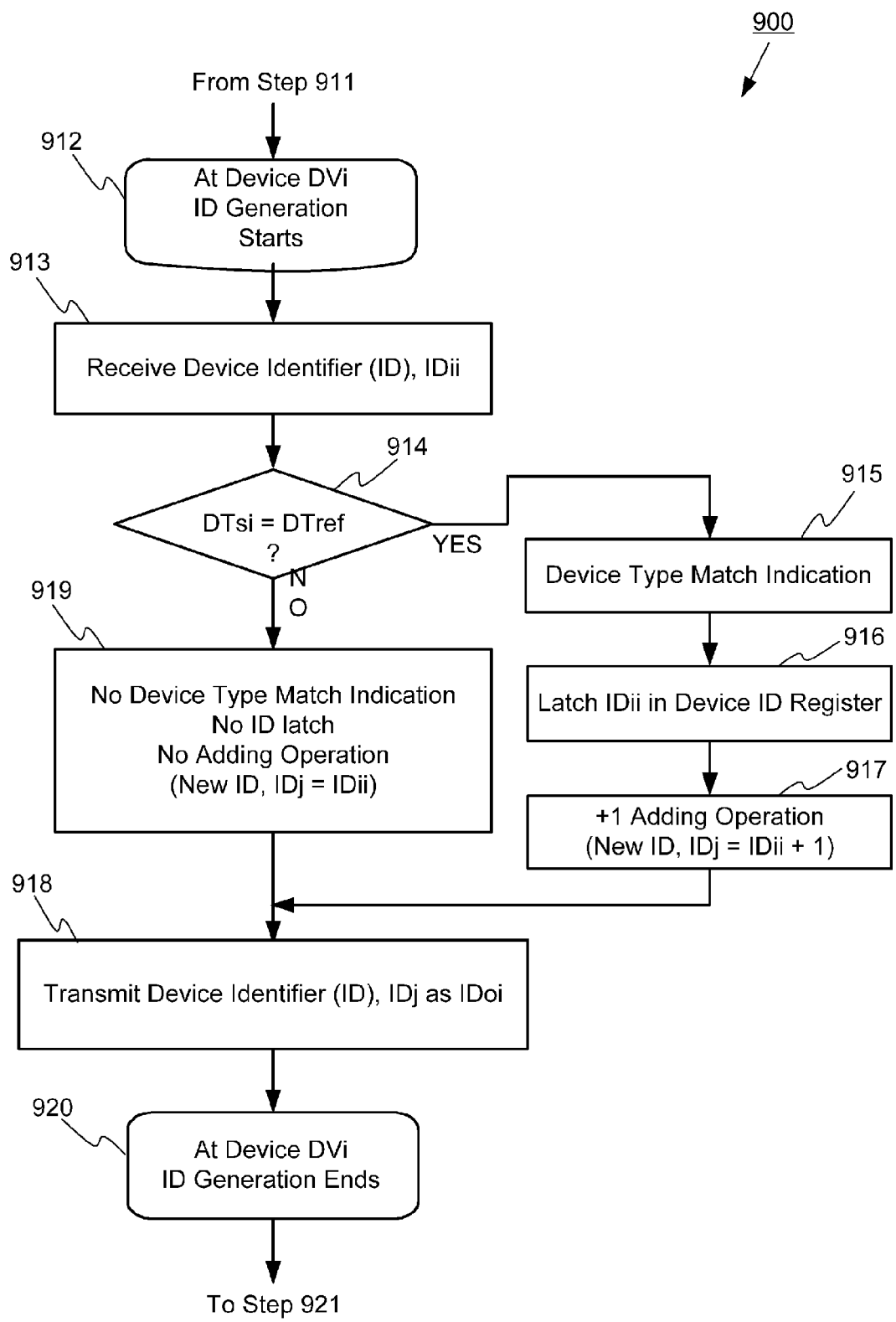
FIG. 12B is a flowchart illustrating part of the ID generation shown in FIG. 12A.

FIG. 11 shows the signals for the ID generation in the serial interconnection arrangement to where the ID generator 834 shown in FIG. 10 is applied. FIG. 12A shows an ID generation method performed by the ID generator shown in FIG. 10. FIG. 12B shows part (step 900) of the ID generation method of FIG. 12A.

Referring to FIGS. 10, 11, 12A and 12B, before the ID generation process, the ID generation command and a device type DT, DTsi, are provided by the memory controller to all devices in the serial interconnection, so that all devices are ready for ID generation (step 911). In step 911, at each device, the device type DTsi is held in the DT register 439 in response to the DT register clocks from the DT clock generator 441. Thereafter, the i-th device DVi starts the ID generation process (step 912). The device DVi (e.g., device 2) receives, from the previous device DV(i−1) (e.g., device 1), a device ID, IDii, and the received ID is held in the temporary ID register 440 (step 913). In response to the ID generation control signal 821, the DT comparator 461 compares the previously received DTsi held in the register 439 to a reference DTref corresponding to the device type (step 914). In the case of a match between DTsi and DTref, the comparison result of "match" is registered in the comparison result register 463 and the DT match signal is "high" (step 915). The ID register 431 latches the received device ID, IDii (step 916), thereby establishing the device ID for the present device, DVi. After step 916, the ID number is altered by a "+1" operation (step 917), resulting in a new device ID, IDj. The new device ID, IDj, is converted to a serial signal for transmission to the next device DV(i+1) (e.g., device 3) in the serial interconnection (step 918). As a result, the next device DV(i+1) receives the ID number, IDii. As the device DV(i+1) already received and held the device type DTsi in its DT register, the same ID generation process is performed.

If there is no match between the DTsi and the DTref (a negative determination at step 914), the DT match signal will be "low". The device does not store the received device ID number, IDii, with no adding operation (step 919). The non-altered IDii, as a new IDj, is transferred to the next device (step 918). Upon completion of step 918, the ID generation process at the device DVi ends (step 920). The process shown in FIG. 11 can be repeated at each device in the serial interconnection. After the ID generation process ends at all devices, the ID generation mode operation ends, as the ID generation mode exit signal 422 is fed to the ID generator 834 (step 921). Thereafter, the system performs the function of data process in the normal mode (step 922).

Figure 13:
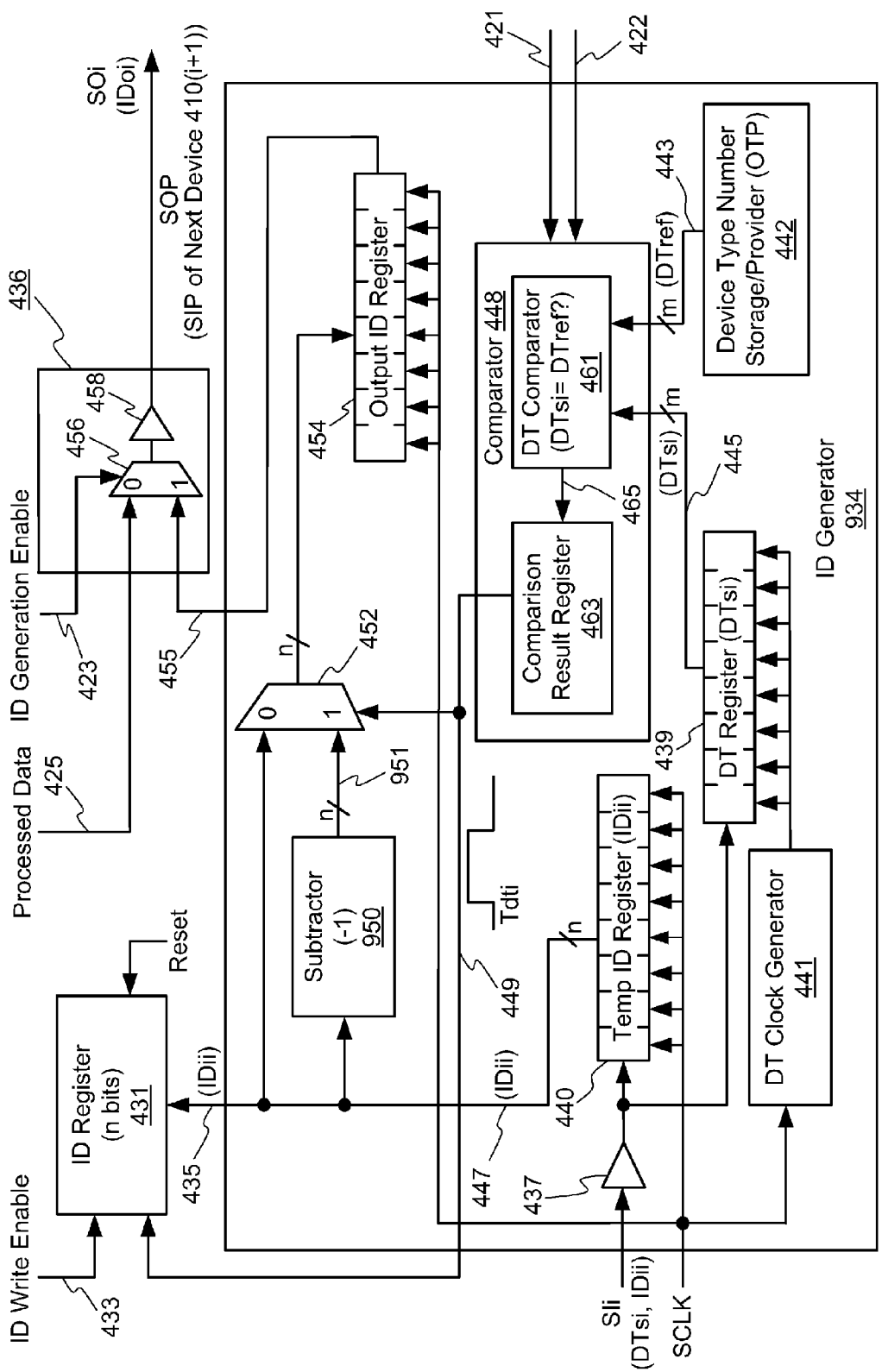
FIG. 13 is a block diagram illustrating another example of the ID generator.

FIG. 13 shows another example of the ID generator. The ID generator is similar to that of FIG. 6D. A difference is that the ID generator 934 of FIG. 13 has a subtractor 950, instead of the adder 450 of FIG. 6D. The subtractor 950 performs the subtraction of one from the received ID, IDii, to provide a subtracted signal 951 to the selector 452. With such a subtraction, consecutive IDs from high to low are established.

There are variations to the above-described embodiments. The configuration of the devices 120-1-120-4 in FIG. 1A may include both a serial interconnection (e.g., an input SIP and an output SOP) and conventional multi-drop connections (e.g., the clock signal SCLK and the chip select signal /SCS). Thus, the configuration may be referred to as a hybrid of serial interconnection and multi-drop configurations, where the advantages of each may be realized. Alternatively, embodiments of the techniques described herein may be implemented in serial, parallel, multi-drop or other connections, and combinations thereof, between devices.

In the above-described embodiments, the operation has been described based on the active "high" signals for the purpose of simplicity. They may be designed to perform the operation based on the "low" active signals, in accordance with a design preference. The control signals may have two bytes or more than two bytes in accordance with operation code assignment. Timing control can be changed from the sequential and multiple clocks enabled by command type to the single clock with additional control signals to activate the selected serial registers. The sequence of issuing multiple clocks can be varied in accordance with the specification of timing, arrangement of addresses, and the length of addresses. As mentioned before, it can apply the serial Flash memory or a product with serial input bit stream control.

In the embodiments described above, the device elements and circuits are connected to each other as shown in the figures, for the sake of simplicity. In practical applications of the present invention to apparatus, devices, elements, circuits, etc., they may be connected directly to each other. As well, devices, elements, circuits etc., may be connected indirectly to each other through other devices, elements, circuits, interfaces, etc., necessary for operation of the apparatus. Thus, in actual configuration, the elements and devices are directly or indirectly coupled with or connected to each other.

It is apparent to those of ordinary skill in the art that the ID generators or producers, the controllers, the processors and the other device elements and the memory controllers may be achieved by hardware and software.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A system comprising a plurality of devices having one or more device type including at least first and second devices, the plurality of devices being serially coupled, the first device having serial input and output connections, the second device having a serial input connection, the serial input connection of the first device being coupled to a serial output connection of a control signal provider, the serial output connection of the first device being coupled to the serial input connection of the second device, the first device comprising:
a receiver for receiving a device identifier (ID) and a device type (DT) through the serial input connection thereof;
a device information provider for providing DT information (DTI) of the first device;
a determiner for determining whether the received DT matches the DTI of the first device to provide a determination result of a match or a non-match, the determiner comprising a comparator for comparing the received DT to the provided DTI to provide the determination result;
an ID producer for producing an ID in response to the determination of match, the ID producer comprising a calculator for performing the calculation of the ID based on the received ID and a pre-defined value, a selector for selecting one of the calculated ID and the received ID in response to the determination result from the comparator, the selected ID being outputted through the output connection of the first device; and
a signal output provider for outputting the received ID in response to the determination of non-match.

2. The system of claim 1, wherein the control signal provider is configured to provide control signals to the plurality of devices, the plurality of devices being controlled in response to the control signals from the control signal provider.

3. The system of claim 2, wherein the ID producer further comprises an ID assignor configured to assign the ID in response to the determination result.

4. The system of claim 3, wherein the ID assignor further comprises:
an information holder configured to hold the selected ID therein.

5. The system of claim 4, wherein the information holder comprises a register configured to store the received ID.

6. The system of claim 1, wherein the calculation of the ID based on the received ID and the pre-defined value comprises addition of the received ID and the pre-defined value.

7. The system of claim 6, wherein the pre-defined value is one, the calculated ID comprising an increment of the received ID by one.

8. The system of claim 1, wherein the calculation of the ID based on the received ID and the pre-defined value comprises subtraction of the pre-defined value from the received ID.

9. The system of claim 8, wherein the pre-defined value is one, the calculated ID comprising a decrement of the received ID by one.

* * * * *